US011911833B2

(12) United States Patent
Ross

(10) Patent No.: US 11,911,833 B2
(45) Date of Patent: Feb. 27, 2024

(54) SYSTEM AND METHOD OF RE-PROFILING LOCOMOTIVE RAILCAR WHEELS

(71) Applicant: HJR Real Estate Management, LLC, Escanaba, MI (US)

(72) Inventor: Harold F. Ross, Escanaba, MI (US)

(73) Assignee: HJR Real Estate Management, LLC, Escanaba, MI (US)

( * ) Notice: Subject to any disclaimer, the term of this patent is extended or adjusted under 35 U.S.C. 154(b) by 0 days.

(21) Appl. No.: 17/863,076

(22) Filed: Jul. 12, 2022

(65) Prior Publication Data

US 2022/0347759 A1 Nov. 3, 2022

Related U.S. Application Data

(63) Continuation of application No. 17/678,563, filed on Feb. 23, 2022, which is a continuation of application
(Continued)

(51) Int. Cl.
*B23B 5/32* (2006.01)
*B23B 25/06* (2006.01)
(Continued)

(52) U.S. Cl.
CPC ............... *B23B 5/32* (2013.01); *B23B 5/28* (2013.01); *B23C 3/00* (2013.01); *B23C 5/28* (2013.01);
(Continued)

(58) Field of Classification Search
CPC .... B23B 3/26; B23B 5/08; B23B 5/28; B23B 5/32; B23B 25/06; B23C 3/00;
(Continued)

(56) References Cited

U.S. PATENT DOCUMENTS

| 1,397,468 A | 11/1921 | Teas et al. |
| 1,604,962 A | 11/1926 | Benzon, Jr. |

(Continued)

FOREIGN PATENT DOCUMENTS

| DE | 30 12 996 A | 10/1981 |
| EP | 0 491 067 A1 | 6/1994 |

(Continued)

OTHER PUBLICATIONS

Brinkmann et al., "Doppel-Unterflur-Radsatzdrehmaschine Mit Reibrollenantrieb IM DB-Werk Muenchen-Pasing Fuer Den Ice," Zeitschrift Fur Eisenbahnwesen Und Verkehrstechnik, Aug. 1, 1994, 7 pages.

(Continued)

*Primary Examiner* — Sara Addisu
(74) *Attorney, Agent, or Firm* — Foley & Lardner LLP

(57) ABSTRACT

An apparatus reconfigures or configures a wheel associated with a train. The apparatus comprises a tool configured to engage the wheel a compound slide system for positioning the cutting tool in at least two axes. The compound slide system is controlled so that the wheel is configured in accordance with a profile. The slide system can be moved mechanically and/or pneumatically and/or can use a mechanical profile. The apparatus can have a low profile and a low weight.

10 Claims, 16 Drawing Sheets

Related U.S. Application Data

No. 16/273,936, filed on Feb. 12, 2019, now Pat. No. 11,426,800, which is a continuation-in-part of application No. 13/745,520, filed on Jan. 18, 2013, now Pat. No. 10,226,824, which is a continuation-in-part of application No. PCT/US2012/036755, filed on May 7, 2012, and a continuation-in-part of application No. 12/886,418, filed on Sep. 20, 2010.

(60) Provisional application No. 61/484,562, filed on May 10, 2011.

(51) Int. Cl.
 B23B 5/28 (2006.01)
 B23C 5/28 (2006.01)
 B23C 3/00 (2006.01)

(52) U.S. Cl.
 CPC ............... Y10T 82/10 (2015.01); Y10T 82/18 (2015.01); Y10T 82/185 (2015.01); Y10T 83/162 (2015.04)

(58) Field of Classification Search
 CPC ....... B23Q 15/007; Y10T 82/10; Y10T 82/18; Y10T 82/185; Y10T 83/162; B61K 5/00; B61K 5/04
 See application file for complete search history.

(56) References Cited

U.S. PATENT DOCUMENTS

| | | | |
|---|---|---|---|
| 2,677,307 A | 5/1954 | Bloss | |
| 3,256,754 A | 6/1966 | Rivierre et al. | |
| 3,323,397 A | 6/1967 | Ladoues | |
| 3,598,017 A | 8/1971 | Saari | |
| 3,667,329 A | 6/1972 | Dombrowski | |
| 4,276,793 A * | 7/1981 | Wirtz ..................... B23B 5/32 82/104 | |
| 4,347,769 A | 9/1982 | Dombrowski et al. | |
| 4,802,285 A | 2/1989 | Ligacz et al. | |
| 4,939,962 A | 7/1990 | Wittkopp et al. | |
| 4,951,534 A | 8/1990 | Brinkmann et al. | |
| 5,105,691 A | 4/1992 | Brinkmann et al. | |
| 5,511,913 A | 4/1996 | Naumann | |
| 5,561,242 A | 10/1996 | Naumann et al. | |
| 5,678,963 A | 10/1997 | Heimann | |
| 5,678,966 A | 10/1997 | Heimann | |
| 5,678,973 A | 10/1997 | Cox | |
| 5,890,554 A | 4/1999 | Sturges | |
| 5,890,854 A | 4/1999 | Naumann et al. | |
| 6,264,407 B1 | 7/2001 | Tinken | |
| 6,519,861 B1 | 2/2003 | Brueck et al. | |
| 6,769,365 B1 | 8/2004 | Ward | |
| 6,871,416 B2 | 3/2005 | Leja et al. | |
| 8,186,250 B2 | 5/2012 | Ross | |
| 8,408,105 B2 | 4/2013 | Ross | |
| 8,789,448 B2 | 7/2014 | Ross | |
| 8,806,996 B2 | 8/2014 | Cooper | |
| 2010/0005935 A1 | 1/2010 | Ross | |
| 2010/0154606 A1 | 6/2010 | Thyni | |
| 2012/0067179 A1 | 3/2012 | Ross | |
| 2013/0042731 A1 | 2/2013 | Ross | |
| 2013/0112052 A1 | 5/2013 | Reiche | |
| 2014/0144301 A1 | 5/2014 | Naumann et al. | |
| 2022/0347759 A1 | 11/2022 | Ross | |

FOREIGN PATENT DOCUMENTS

| | | | |
|---|---|---|---|
| EP | 2 303 493 | | 4/2011 |
| JP | 09-108902 A | | 4/1997 |
| JP | 09-295201 A | | 11/1997 |
| JP | 2011031312 A | * | 2/2011 |
| KR | 970008073 B1 | | 5/1997 |
| RU | 2244609 C1 | | 1/2005 |
| WO | WO-2004/085100 A2 | | 10/2004 |
| WO | WO-2008/061937 A2 | | 5/2008 |
| WO | WO-2010/006039 A2 | | 1/2010 |
| WO | WO-2019/096971 A1 | | 5/2019 |

OTHER PUBLICATIONS

International Search Report and Written Opinion for International Application No. PCT/US09/49921, dated Feb. 22, 2010, 7 pages.
Promotional materials for a portable wheel lathe of a type understood to be commercially available from Independent Machine Company; printed from website http://www.imc-info.com/ironhorselathes.html; Oct. 13, 2008; 2 pages.

* cited by examiner

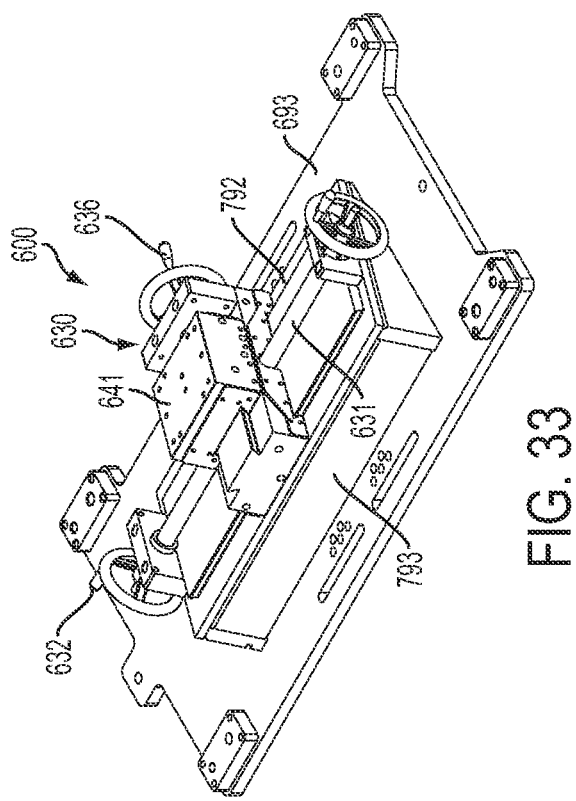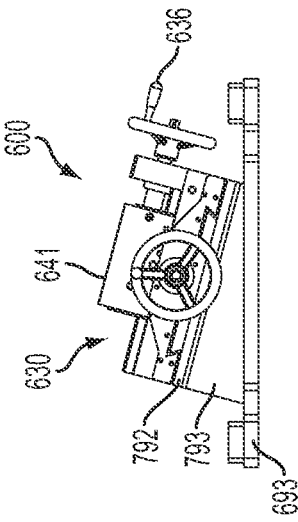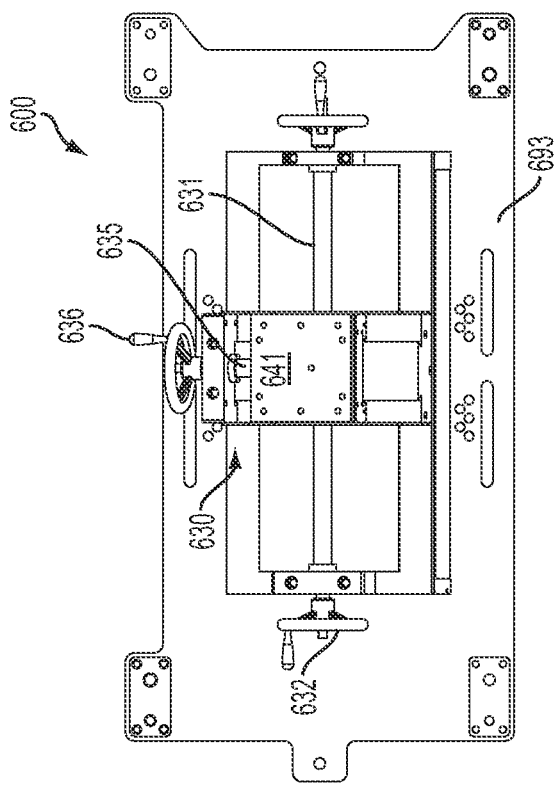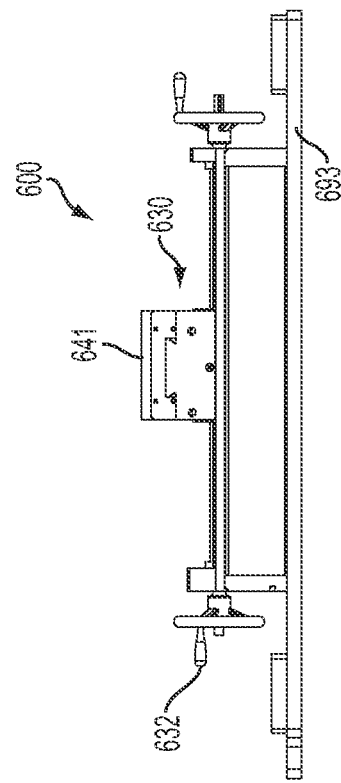
FIG. 33
FIG. 36
FIG. 34
FIG. 35

SYSTEM AND METHOD OF RE-PROFILING LOCOMOTIVE RAILCAR WHEELS

CROSS-REFERENCE TO RELATED PATENT APPLICATIONS

The present application claims priority to and is a continuation of U.S. application Ser. No. 17/678,563, filed Feb. 23, 2022, which is a continuation of U.S. application Ser. No. 16/273,936 entitled "PORTABLE PROFILER FOR LOCOMOTIVE OR RAIL CAR WHEELS" filed on Feb. 12, 2019, which is a continuation-in-part of U.S. application Ser. No. 13/745,520, entitled "PORTABLE PROFILER FOR LOCOMOTIVE OR RAIL CAR WHEELS" filed on Jan. 18, 2013 (now U.S. Pat. No. 10,226,824), which is a continuation-in-part of U.S. patent application Ser. No. 12/886,418 filed on Sep. 20, 2010 (now U.S. Pat. No. 8,789,448), and is a continuation-in-part of PCT/US2012/036755 filed May 7, 2012, which claims priority to provisional Application No. 61/484,562, filed on May 10, 2011, all of which are herein incorporated by reference in their entireties. Further, the present application is related to, but does not claim the benefit of priority to, U.S. patent application Ser. No. 12/171,151 filed Jul. 10, 2008, entitled "Wheel Lathe For Box Cars" (now U.S. Pat. No. 8,186,250) and PCT Application Ser. No. PCT/US2009/049921 filed Jul. 8, 2009, both incorporated in their entireties herein by reference.

FIELD

The present disclosure relates generally to the field of maintenance for wheeled vehicles. More specifically, the present disclosure relates to an apparatus for and a method of machining and or maintaining the wheels associated with wheeled vehicles such as a train (e.g., a locomotive, railway car or other railway vehicle).

BACKGROUND

Wheels on railway locomotives and cars are subject to abuse and wear in the course of normal use. This wear changes the contour of the wheel, forming undesirable contours including flats, high flanges and other contours that adversely affect the performance of the wheel. A worn wheel can reduce ride quality, increase the risk of derailments, and contribute to increased wear, fatigue, noise, and damaged switches excessive fuel consumption.

Locomotive and railcar wheel maintenance is important to safety and efficient operation of railways. Locomotive and railcar wheel maintenance typically involves removing the locomotive or railcar from service and re-profiling or "retruing" the wheel with a lathe mechanism. Such known lathe mechanisms may be provided in pits below removable rail sections. Such mechanisms may be computer numerical control (CNC) machines and are generally large, expensive, and not portable. Stationary mechanisms require establishing a permanent maintenance facility or area and removing the locomotive or railcar from service. In this application, the term "portable" refers to a machine that can be moved by one or two people.

Locomotive and railcar wheels may also be re-profiled with manual lathe mechanisms. However, such manual processes are generally time-consuming and require intense labor, taking as many as sixteen hours to re-profile a pair of wheels. In addition, some known processes create a long, continuous chip. A machinist is required to wear safety gear such as heavy leather clothing and a face shield to avoid being injured by the extremely hot, razor sharp chips. The terms "profiling" and "re-profiling" are used interchangeably in this application.

Thus, there is a need for a portable re-profiling system for wheels of locomotives or railcars. Furthermore, there is a need for a lathe mechanism that is more efficient and safer than manual lathe mechanisms. Further still, there is a need for an automated re-profiling system that is quick, efficient and less expensive than conventional systems located in permanent maintenance facilities. Still further, there is a need for a lower profile, portable, re-profiling system for wheels of locomotives or railcars that can operate without removing a brake or other assemblies. Yet further still, there is a need for an alignment system for a lathe mechanism or other cutting or milling device for re-profiling wheels of locomotives or railcars. Yet further, there is a need for a low profile lathe that can profile a wheel in the field without removing brake or other apparatus associated with the wheel.

SUMMARY

One embodiment relates to a method of re-profiling a wheel while attached to a railcar or locomotive on a rail. The method includes disengaging the wheel from the rail; attaching a lathe machine to the track; rotating the wheel; and profiling the wheel at a point below a center line of the wheel. The center line of the wheel is parallel to the rail and extending through a center point of the wheel. The wheel is profiled using a mechanical template.

Another embodiment relates to a system for re-profiling a first wheel in accordance with a first profile. The first wheel is associated with a train. The system includes a lathe cutting tool configured to engage the first wheel; and a hand-driven compound positioning system for positioning the cutting tool in at least two axes. The system has a low profile.

Yet another embodiment relates to a system for re-profiling a first wheel in accordance with a first profile. The first wheel is associated with a train. The system includes a lathe cutting tool configured to engage the first wheel; and a pneumatically driven compound positioning system for positioning the cutting tool in at least two axes. The system has a low profile.

BRIEF DESCRIPTION OF THE DRAWINGS

Exemplary embodiments will hereafter be described, wherein like numerals denote like elements and:

FIG. 33 is a perspective view schematic illustration of a low profile apparatus for re-profiling a wheel in accordance with yet another exemplary embodiment.

FIG. 34 is a top view schematic illustration of the apparatus for re-profiling illustrated in FIG. 33 in accordance with another exemplary embodiment.

FIG. 35 is a front view schematic illustration of the apparatus for re-profiling illustrated in FIG. 33 in accordance with another exemplary embodiment.

FIG. 36 is a side view schematic illustration of the apparatus for re-profiling illustrated in FIG. 33 in accordance with another exemplary embodiment.

DETAILED DESCRIPTION OF THE PREFERRED EMBODIMENTS

Figure 1:
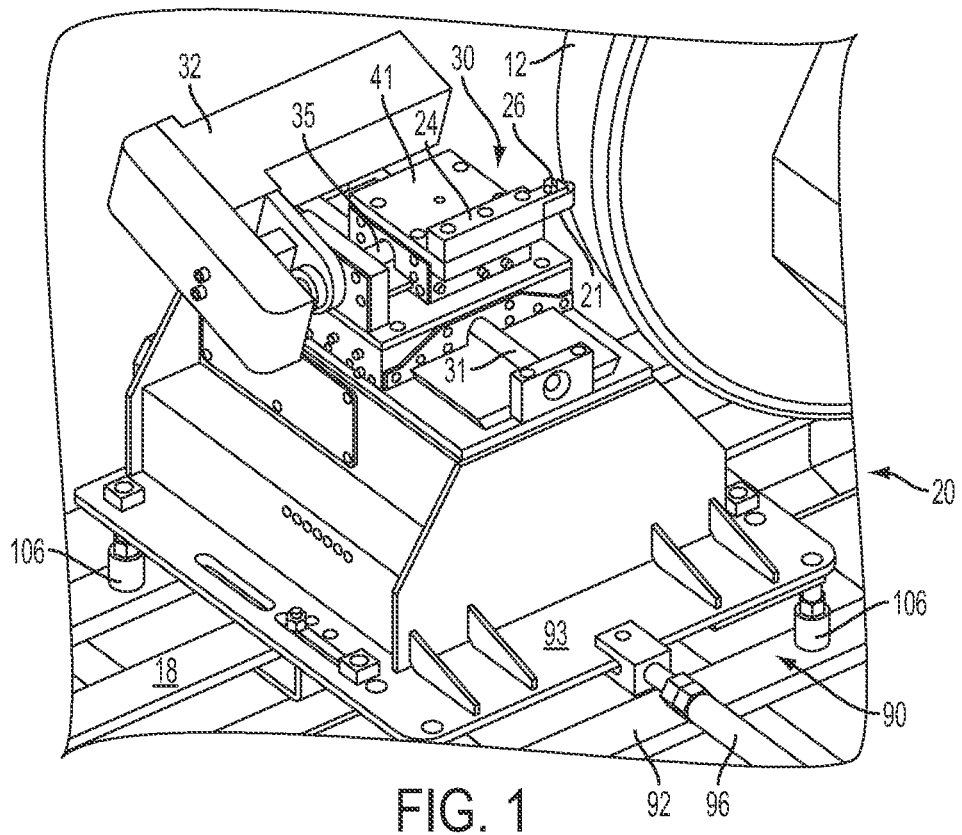
FIG. 1 is a perspective view schematic illustration of an apparatus for reprofiling a wheel associated with a train in accordance with an exemplary embodiment.

Referring in general to the FIGURES and more specifically to FIGS. 1-4, an apparatus 20 for profiling or re-profiling a wheel 12 associated with a train (e.g., the wheel of a railcar, locomotive, or other railway vehicle or apparatus) is shown according to an exemplary embodiment. For the purpose of this specification and the claims, railroad cars include any wheeled systems configured for riding on railroad tracks or rails of any size. Apparatus 20 is preferably a computer controlled lathe apparatus that is configured to be coupled to the track associated with wheel 12.

Apparatus 20 is preferably a portable lathe device that is configured to be coupled to a rail 18 upon which wheel 12 is resting. Alternatively, milling, grinding or other cutting principles could be utilized by apparatus 20 to profile wheel 12.

To provide a precise profile for wheel 12 with a relatively short cycle time, apparatus 20 is preferably a computer numerical control (CNC) lathe. The desired profile for wheel 12 and the cutting path needed to provide the profile for wheel 12 is stored in a computer control coupled to apparatus 20. The computer control can be integrated within or be separate from apparatus 20. The computer control can include a processor or micro controller and memory configured to control actuators such as motors.

A profile for wheel 12 is provided by rotating wheel 12 and moving cutting tool 24 relative to wheel 12 with a 2-axis slide mechanism 30. A user may operate an interface coupled to a computer control to control apparatus 20.

Apparatus 20 is able to be easily moved to a railcar or locomotive (e.g., in field profiling) instead of having to move the railcar or locomotive to apparatus 20 (e.g., inhouse profiling). While most existing mechanisms can weigh in access of several tons, apparatus 20 is portable and weighs approximately 500 lbs. or less. Apparatus 20, for example, may be used to service a railcar or locomotive that is broken down at a location away from a station or service area. According to one exemplary embodiment, apparatus 20 may include wheels, handles, or other devices that increase the portability of apparatus 20. According to another exemplary embodiment, apparatus 20 may be transported by a vehicle, such as, a forklift or cart.

As shown in FIG. 1, apparatus 20 is coupled to rail 18 associated with a track with a mounting mechanism 90. Mounting mechanism 90 can include members 92 disposed parallel to a rail 18 and/or a bracket 94 coupled to rail 18. Members 92 can be attached to railroad ties associated with rail 18 (FIG. 3) via fasteners. A member 96 can be mounted to the opposite rail to rail 18. Mounting mechanism 90 is preferable configured to support apparatus 20 such that apparatus 20 is level, firmly coupled to rail 18, and aligned with wheel 12. According to an exemplary embodiment, mounting mechanism 90 can include plates, one or more clamps, bolts, other fasteners, etc. for securing apparatus 20 to rail 18.

According to one exemplary embodiment, apparatus 20 is leveled (e.g., so cutting tool 24 moves along a horizontal plane). Apparatus 20 can be leveled with respect to ground or rail 18. A multitude of threaded members 106 are provided about the periphery of plate 93. Apparatus 20 can include integral level indicators, (such as bubble levels, laser levels, etc.). Apparatus 20 can include additional adjustment devices for adjusting the tilt, rotation, or other orientation of apparatus 20 with respect to wheel 12.

Members 106 preferably receive leveling mechanisms such as threaded rods (not shown) with an end that contacts members 90. By turning the leveling mechanisms, the mechanisms move in a vertical direction relative to plate 93 and move various portions of plate 93 and, in turn, apparatus 20, up or down. In one embodiment, plate 93 is adjusted to be parallel with the ground According to one exemplary embodiment, members 106 are provided at each corner of plate 93. According to other exemplary embodiments, members 106 may be provided elsewhere (e.g., along a side of plate 93).

Apparatus 20 includes a cutting tool 24 (FIG. 1) with a cutting blade, bit or an insert 26. Insert 26 can be disposed in a bit holder 21 that is secured with an insert clamp. Tool 24 is disposed on a plate 41 and can be secured to plate 41 by fasteners. Plate 41 can be part of X-Y slide mechanism 30.

The edges of wheels 12 being profiled may include imbedded sand, stones, and other foreign debris. Cutting tool 24 includes a high-quality cutting tool insert 26 that is able to withstand the wear from the imbedded particles. According to one exemplary embodiment, insert 26 is formed from a tungsten carbide material. According to other exemplary embodiments, insert 26 may be formed from cermet, a coated carbide, a ceramic material, or any other suitable material known in the art. While insert 26 is shown as a generally cylindrical member in FIGS. 1, 5, 13 and 14, according to other exemplary embodiments it may have a wide variety of geometries.

Wheel 12 is turned so cutting tool 24 can profile the entire circumference of wheel 12 with a drive mechanism. According to an exemplary embodiment, wheel 12 is turned approximately 16-24 revolutions per minute. According to other exemplary embodiments, wheel 12 may be turned at another rate depending on a variety of factors, including the cutting tool material, cutting tool geometry, motor speed, etc. According to one exemplary embodiment, a drive motor is a 15 hp AC motor with gear reducer or a DC motor configured to turn wheel 12.

Cutting tool 24 is coupled to X-Y slide mechanism 30 via plate 41. Mechanism 30 allows cutting tool 24 to be movable relative to wheel 12 along both an X-axis and a Y-axis. Slide mechanism 30 includes a first slide 31 disposed along an X-axis, perpendicular to rail 18, and a second slide 35 disposed along Y-axis, parallel to rail 18. A first power source 32 is provided to move first slide 31. A second power source 36 (FIG. 4) is provided to move second slide 35. In an alternative embodiment, slide mechanism 30 can also be moved in a Z-direction, perpendicular to the ground or a plane including the X-axis and the Y-axis.

As described above, according to one exemplary embodiment, apparatus 20 is a CNC lathe, and power sources 32 and 36 are electric motors (e.g., servo motors, stepper motors, etc.) that are controlled with signals from a computer controller. Power sources 32 and 36 can be coupled to gear reducers. The electric motors can be AC or DC motors. Gear reducers reduce the shaft speed and increase the torque from power sources 32 and 36. According to various exemplary embodiments, gear reducers may be directly coupled to slide mechanism 30 or may be coupled to slide mechanism 30 through a transfer mechanism.

Sources 32 and 36 can receive electric power from batteries, generators, vehicles, sources aboard the train, or other sources. The batteries can be integrated with or separate from apparatus 20.

As cutting tool 24 profiles wheel 12, it may form a chip of removed material. Because apparatus 20 profiles wheel 12 with an automated CNC process, a user does not need to be in close proximity to wheel 12 as it is being machined, reducing the chance of the user being cut by the chip. Apparatus 20 can be controlled by a wired or wireless remote control.

Figure 2:
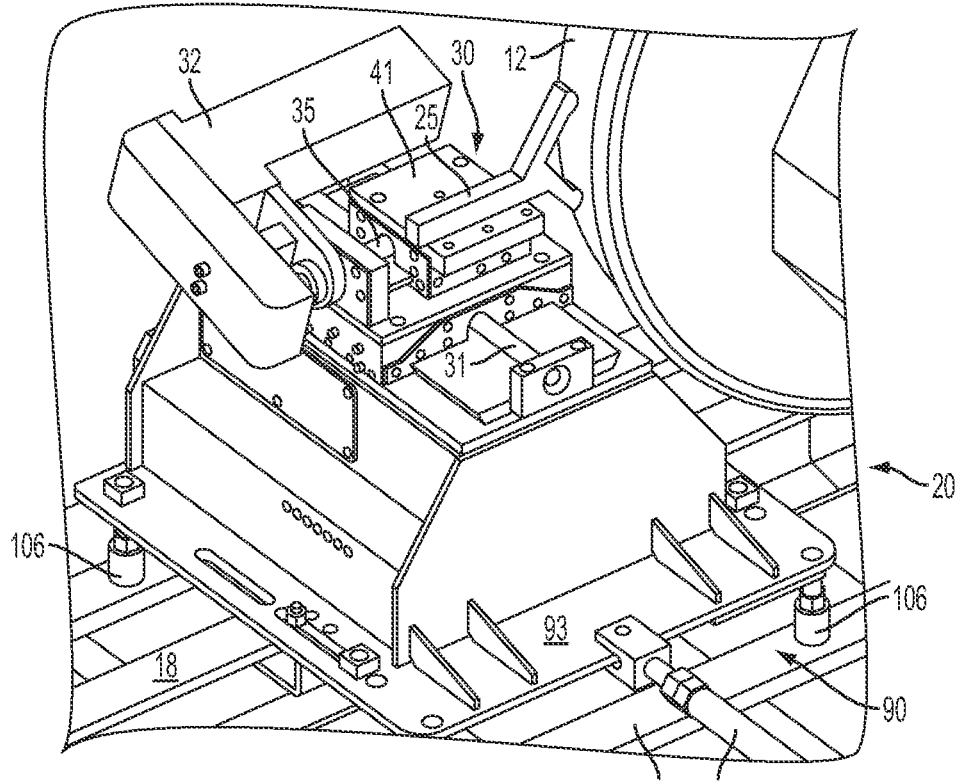
FIG. 2 is a perspective view of the apparatus for re-profiling a wheel illustrated in FIG. 1 and including an alignment device in accordance with another exemplary embodiment.
Figure 3:
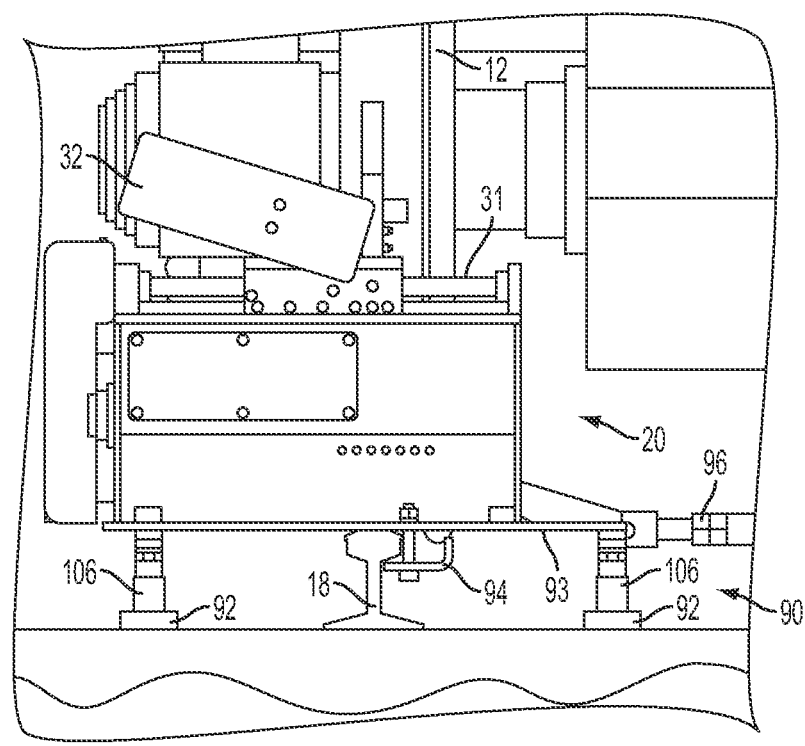
FIG. 3 is a planar side view schematic illustration of the apparatus for reprofiling illustrated in FIG. 2. in accordance with another exemplary embodiment.
Figure 4:
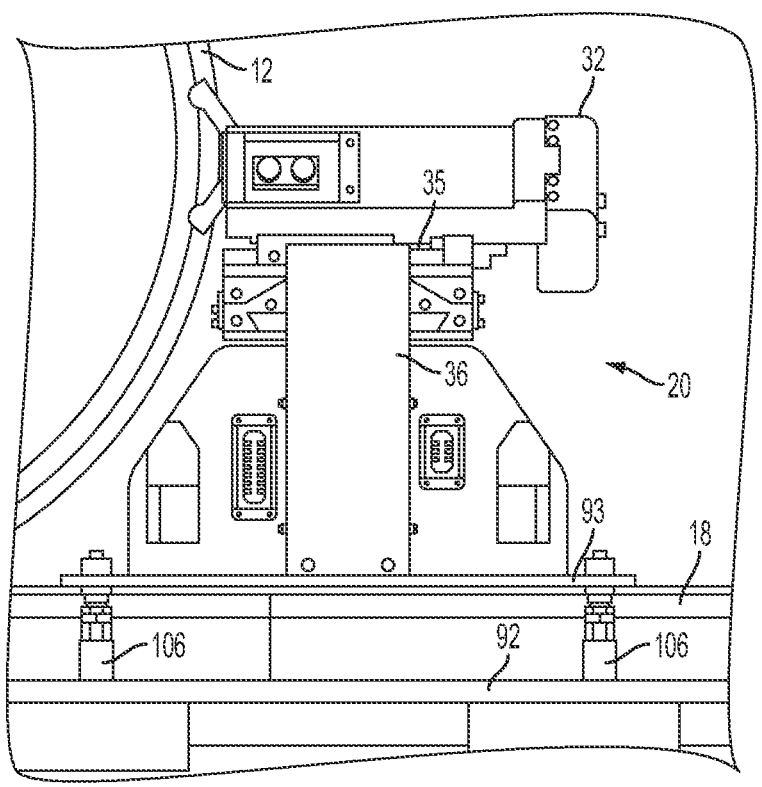
FIG. 4 is another planar side view schematic illustration of the apparatus for reprofiling a wheel illustrated in FIG. 2 in accordance with another exemplary embodiment.

With reference, to FIGS. 2-4, apparatus 20 includes an alignment device 25. Alignment device 25 is preferably removably disposed on a top surface of plate 41 so that a user can determine if the position of cutting tool 24 (FIG. 1) is in proper alignment with wheel 15. The operation of alignment device 25 is described in more detail with respect to FIGS. 15-19.

Figure 5:
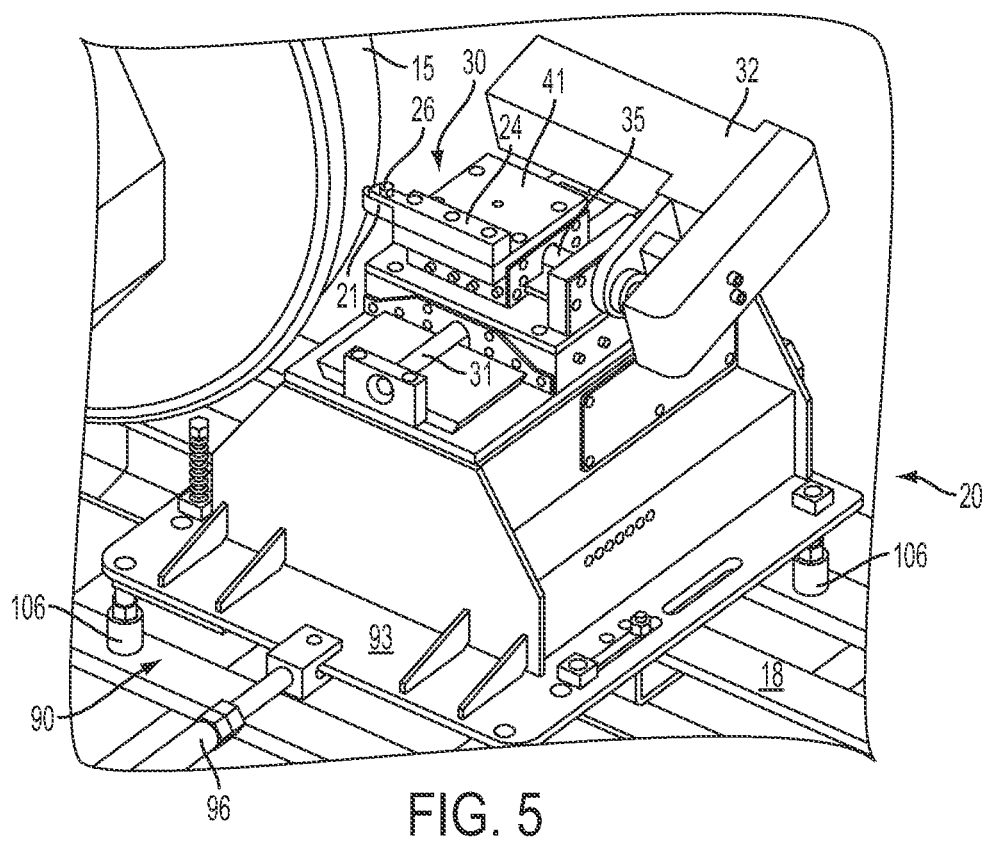
FIG. 5 is a perspective view schematic illustration of the apparatus for reprofiling a wheel opposite to the wheel illustrated in FIG. 1 in accordance with yet another exemplary embodiment.
Figure 6:
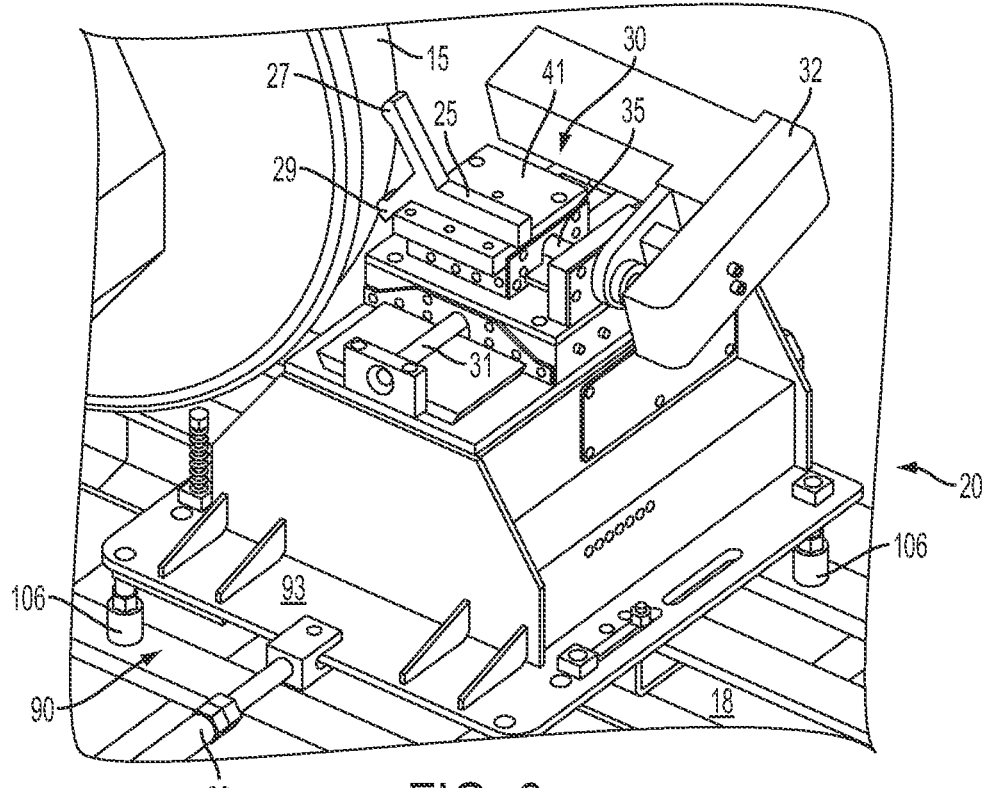
FIG. 6 is a perspective view schematic illustration of the apparatus for reprofiling as illustrated in FIG. 5 including the alignment device in accordance with yet another exemplary embodiment.
Figure 7:
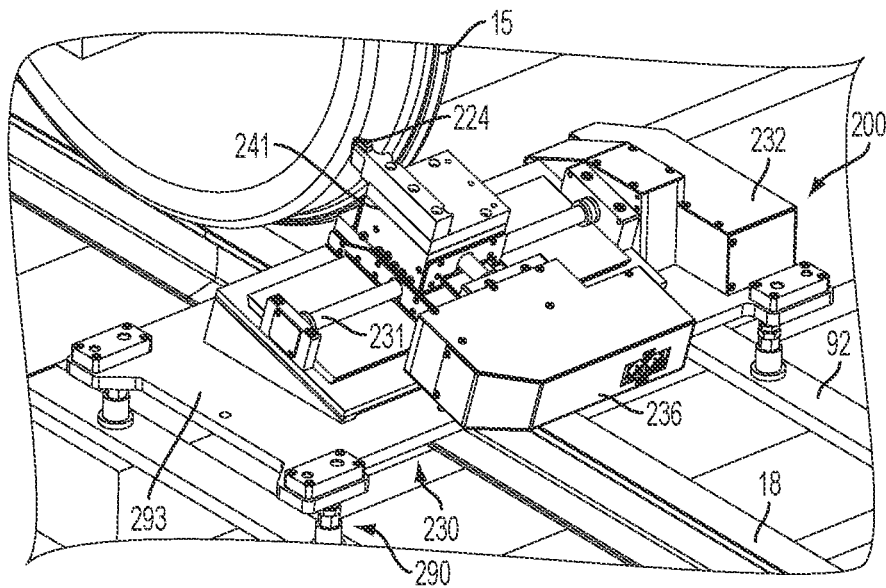
FIG. 7 is a perspective view schematic illustration of a low profile apparatus for re-profiling a wheel in accordance with yet another exemplary embodiment.

With reference to FIGS. 5-6, a wheel 15 is shown with apparatus 20. Wheel 15 is on an opposite side (right side) of the rail car than wheel 12 (left side). Mechanical manipulation of components of apparatus 20 allows apparatus 20 to be switched into a configuration for wheel 15. Cutting tool 24 is preferably flipped 180 degrees to engage wheel 15.

With reference to FIG. 6, apparatus 20 includes an alignment device 25. The operation of alignment device 25 is described in more detail with respect to FIGS. 15-19. Alignment device 25 is suitable for use with either wheel 12 or wheel 15.

With reference to FIGS. 7-12, apparatus 200 is similar to apparatus 20 described above with reference to FIGS. 1-6. Features and operations described above for apparatus 20 are available for apparatus 200. FIGS. 7-12 show apparatus 200 in a field operation where wheels 12 and 15 can be profiled at the location of the train.

With reference to FIGS. 7-10, apparatus 200 is preferably a low profile lathe machine and engages wheel 15 well below a center line 304 (see FIG. 17). Center line 304 is preferably a line through the center point of wheel 15 and parallel to rail 18. Apparatus 200 preferably weighs between 350-400 lbs in a preferred embodiment.

In a preferred embodiment, apparatus 200 generally has a height that is less than 17 inches. Preferably the height is adjustable between 11¾% inches to 17 inches. The height is adjustable using shims 285 (see FIGS. 15-17). Alternatively, the height an be adjustable by other means, including jacks, adjustable legs, etc. The width of apparatus 200 is preferably 25 inches and the length of apparatus 200 is preferably 42 inches.

Apparatuses 20 and 200 can be made from any metal material of sufficient strength. In a preferred embodiment, apparatuses 20 and 200 are manufactured from steel. The above weights and dimension are given in an exemplary fashion only. Other weights and dimensions are possible without departing from the scope of the invention.

Preferably, apparatus 200 is relatively compact and approaches wheel 12 at an acute angle to optimize the ability to fit underneath the majority of components associated with wheel 12. For example, brake assemblies, straps, hangers, collection tanks, steps and the components near wheel 12 can be avoided by using a low profile apparatus 200 and/or approaching wheel 15 at an acute angle. In one embodiment, the acute angle can be between 15 and 45 degrees. Other angles can be utilized depending upon configurations of apparatus 200. Advantageously, apparatus 200 does not require removal of components that are required to be removed when a non-low profile lathe is utilized.

Apparatus 200 includes a mounting mechanism 290 similar to mounting mechanism 90 discussed above. A steel shim can be placed between rail 18 and a bottom surface of a bottom plate 293 to strengthen the base of apparatus 200 and reduce chance of chattering during a cutting operation. (See FIG. 9).

Apparatus 200 also includes cutting tool 224 (FIG. 7) (similar to cutting tool 24 discussed above). Tool 224 can be disposed on a slide mechanism 230. Slide mechanism 230 is preferably disposed at an angle (e.g., 0-90 degrees, preferably 15-45 degrees) with respect to bottom plate 293. Preferably, an angle of less than 45 degrees allows a lower profile apparatus 200 to be provided. In one most preferred embodiment, the angle between mechanism 230 and bottom plate 293 is between 15 to 45 degrees, although other angles can be utilized.

Figure 10:
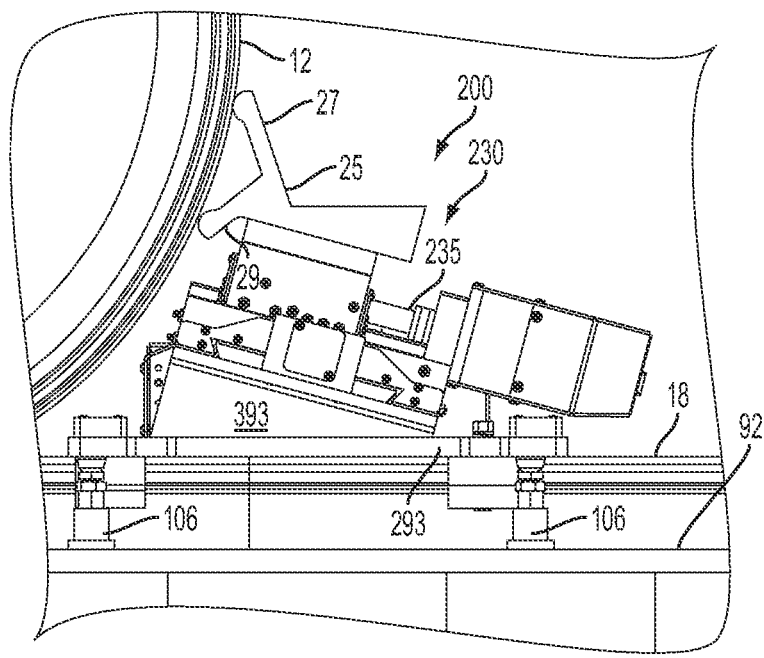
FIG. 10 is a planar side view schematic illustration of the apparatus for reprofiling illustration in FIG. 8 in accordance with another exemplary embodiment.
Figure 11:
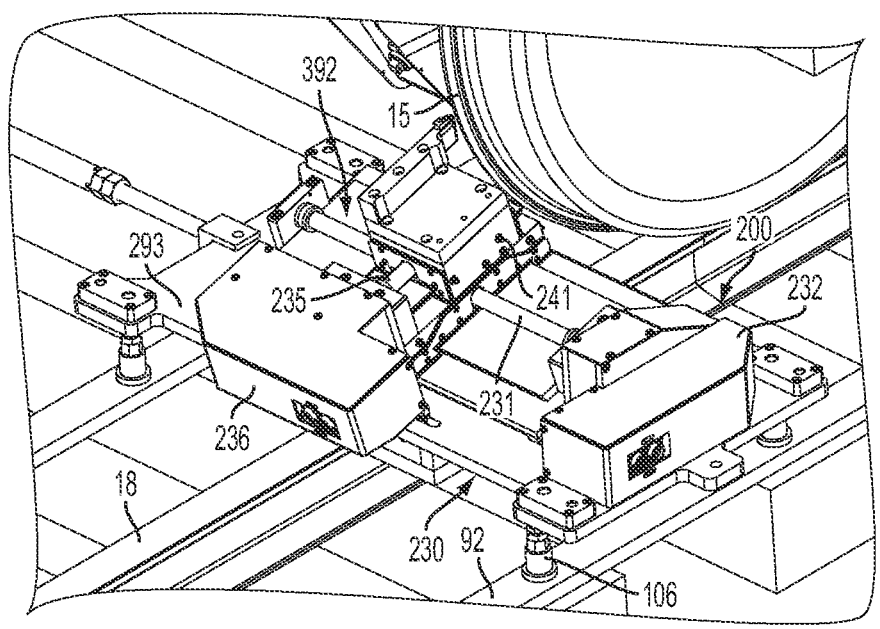
FIG. 11 is a perspective view schematic illustration of the apparatus for reprofiling illustrated in FIG. 7, shown engaging a wheel opposite to the wheel illustrated in FIG. 7 in accordance with another exemplary embodiment.

The angle can be provided by a wedge surface 393 and a slanted surface 392 (FIGS. 10 and 11). The angle is preferably between 0 and 90 degrees and most preferably between 15 and 45 degrees. Bottom plate 293 can be disposed parallel to the ground with mounting mechanism 290.

Slide mechanism 230 moves along a slide rail 231 along an X-axis perpendicular to rail 18 and a slide rail 235 disposed along a Y-axis parallel to rail 18. (See FIG. 8). In an alternative embodiment, slide mechanism 230 can also move in a Z-direction perpendicular to the ground or perpendicular to a plane including the X-axis and the Y-axis.

A first power source 232 is provided to move mechanism 230 along first slide 231 and a power source 236 is provided to move mechanism 230 along slide 235. Power sources 232 and 236 are preferably DC motors. Advantageously, apparatus 200 uses DC drives which are smaller than AC drives in a preferred. The size of the DC drives allows a lower profile apparatus 200 to be configured.

Figure 8:
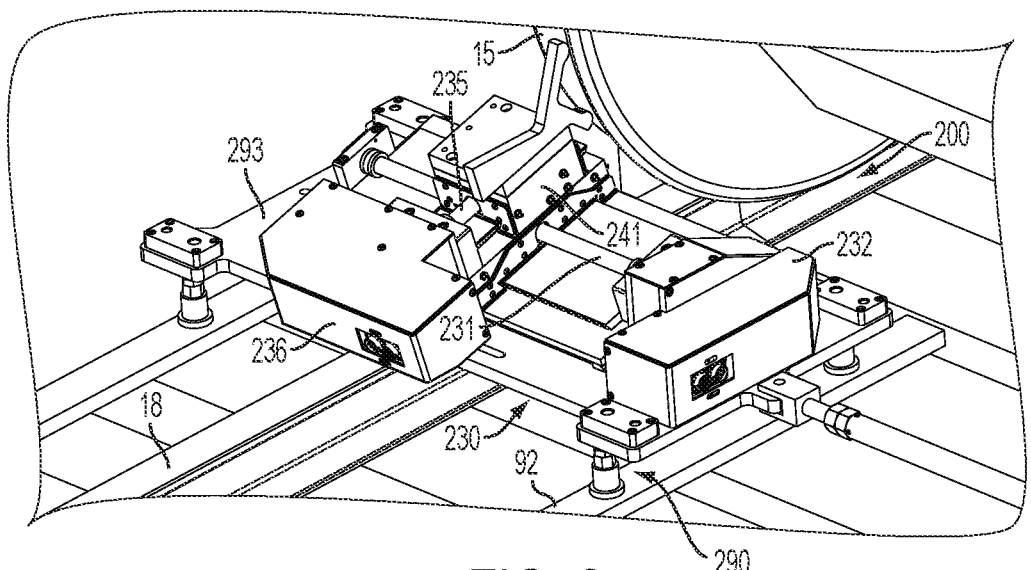
FIG. 8 is a perspective view schematic illustration of the apparatus illustrated in FIG. 7 including an alignment device in accordance with yet another exemplary embodiment.
Figure 9:
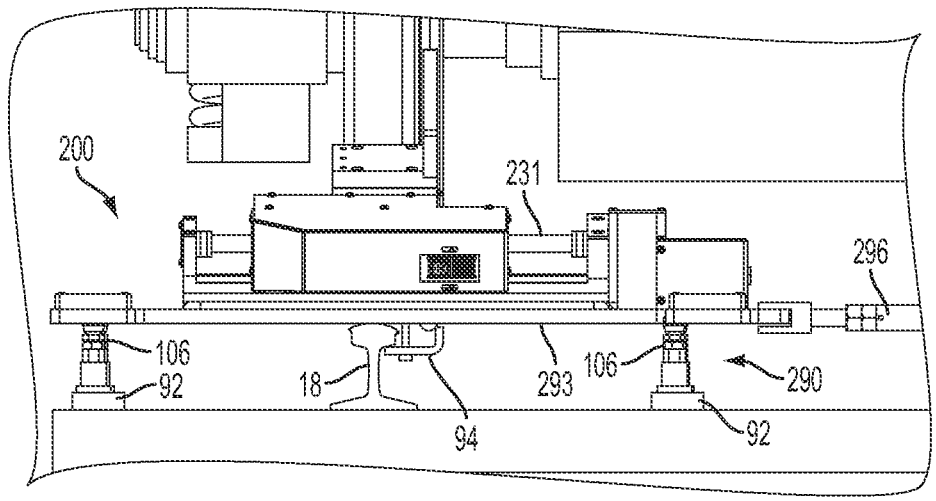
FIG. 9 is a planar side view schematic illustration of the apparatus for reprofiling illustrated in FIG. 8 in accordance with another exemplary embodiment.

With reference to FIGS. 8 and 10, alignment device 25 is utilized with apparatus 200. Alignment device 25 includes a first member 27 and a second member 29. When an end 237 (see FIGS. 15-17) of member 27 and an end 239 of member 29 touch the exterior surface of wheel 15, apparatus 200 is aligned below center line 304 of wheel 15. Center line 304 of wheel 15 is preferably an axis that extends parallel to rail 18 and through a center point of the wheel. By using alignment mechanism 25, an operator of apparatus 200 can ensure that cutting tool 224 engages wheel 15 below the center line 304 in one preferred embodiment.

Figure 18:
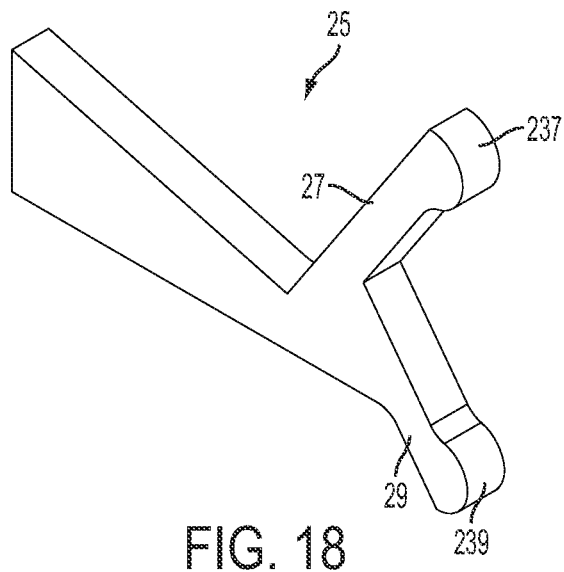
FIG. 18 is a perspective view schematic illustration of the alignment device illustrated in FIGS. 2-4, 6, 8-10, and 15-17 in accordance with another exemplary embodiment.
Figure 19:
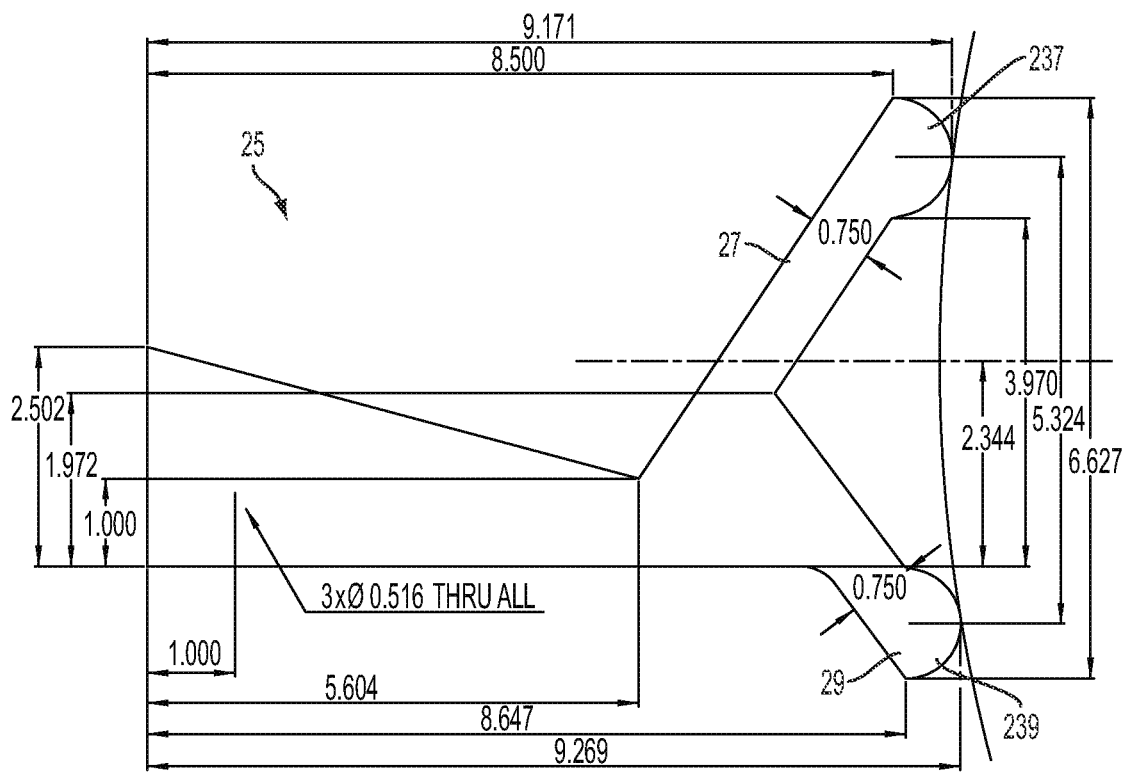
FIG. 19 is a more detailed side planar view schematic illustration of the alignment device for the systems illustrated in FIG. 18 showing exemplary dimensions in accordance with another exemplary embodiment.
Figure 20:
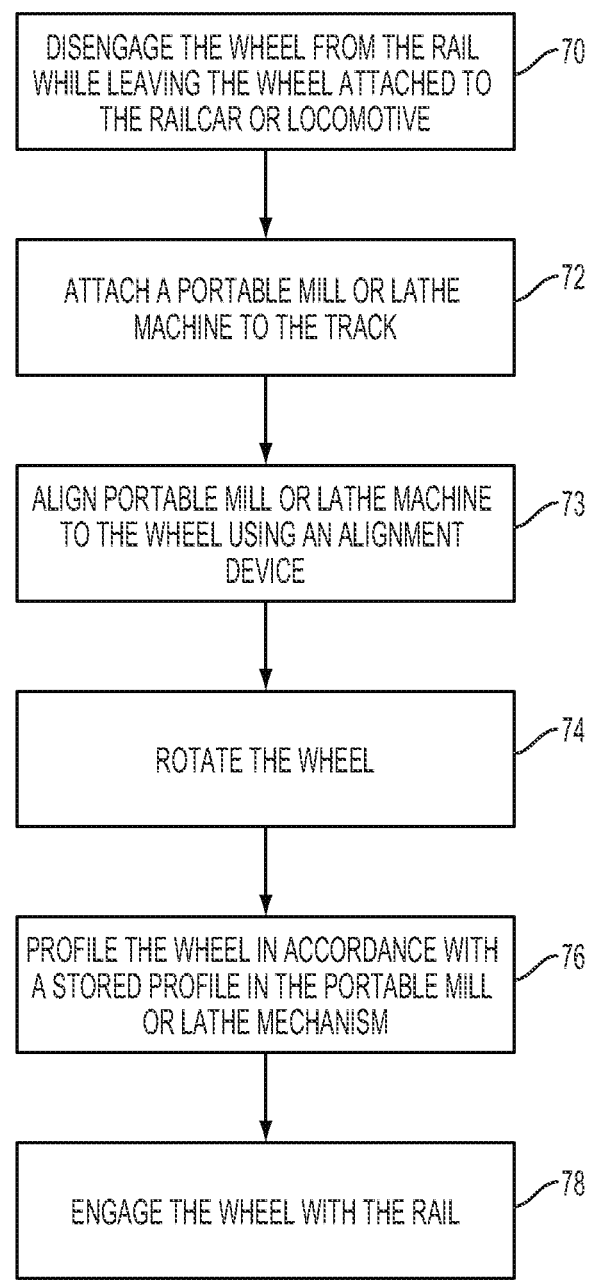
FIG. 20 is a flow diagram of a wheel re-profiling method in accordance with another exemplary embodiment.

Alignment device 25 is preferably a mechanical alignment device such as a center finder. Alignment device 25 can be manufactured from a variety of materials, including high strength plastics, metals, etc. In one embodiment, alignment device 25 is one inch thick. FIG. 18 shows exemplary dimensions for alignment tool 25.

Figure 12:
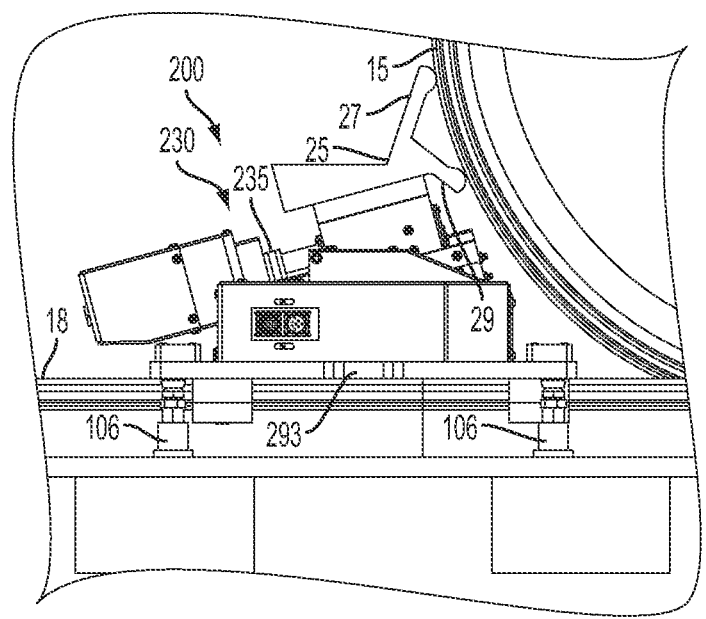
FIG. 12 is a side view schematic illustration of the apparatus for re-profiling illustrated in FIG. 11 including an alignment device in accordance with still another exemplary.

With reference to FIGS. 11 and 12, a wheel 15 opposite wheel 12 is profiled using an apparatus 200. However, unlike apparatus 20, rotation of cutting tool 224 is not necessary as an inverse profile is utilized. Accordingly, the computer control stores a profile for wheel 12 and an inverse profile for wheel 15. Alignment device 25 is shown for use with wheel 15 in FIG. 12.

Figure 13:
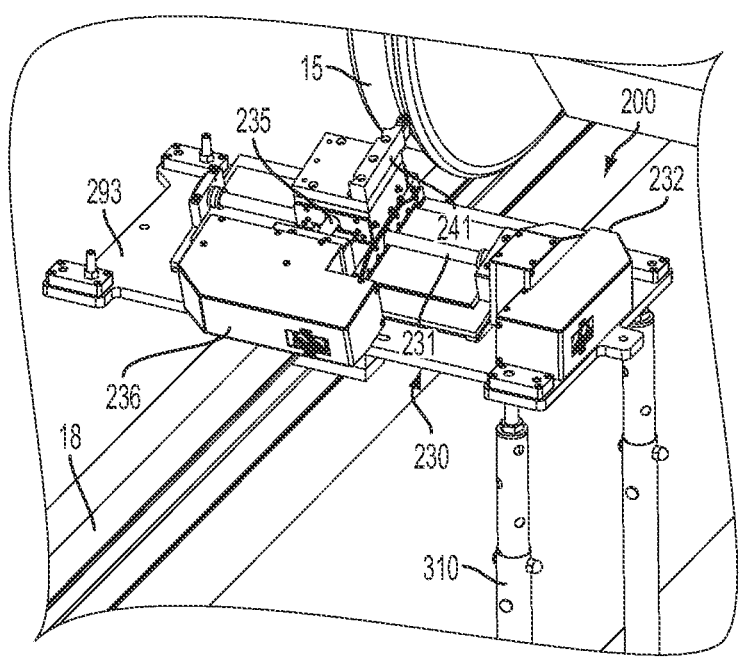
FIG. 13 is a perspective view schematic illustration of another apparatus for reprofiling shown in a in-house application in accordance with another exemplary embodiment.
Figure 14:
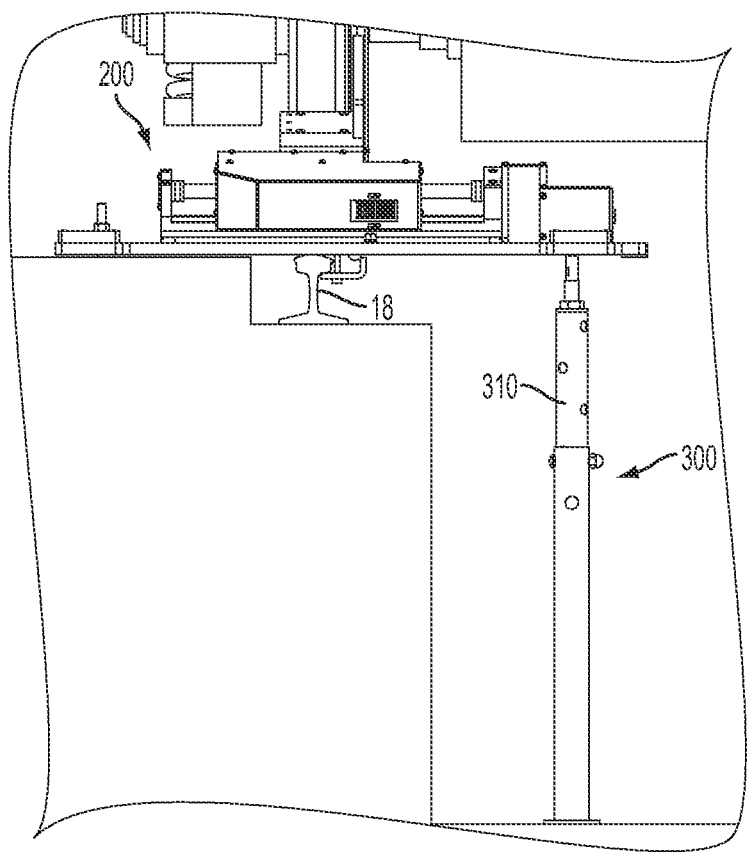
FIG. 14 is a side view schematic illustration of the apparatus for re-profiling illustrated in FIG. 13 in accordance with another exemplary embodiment.

With reference to FIGS. 13-14, apparatus 200 is shown in an in-house application including a work area 300. Apparatus 200 utilizes a vertical member 310 to support apparatus 200 in work area 300.

Figure 15:
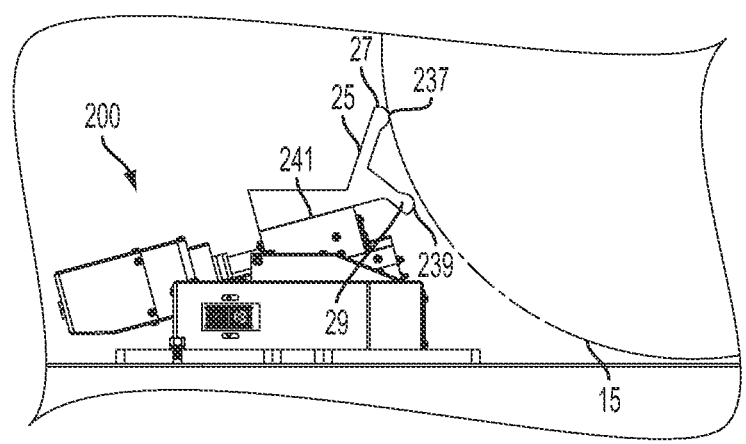
FIG. 15 is a side view schematic illustration of the apparatus for re-profiling illustrated in FIG. 7 shown with an alignment device indicating a cutting tool position that is too low in accordance with another exemplary embodiment.
Figure 16:
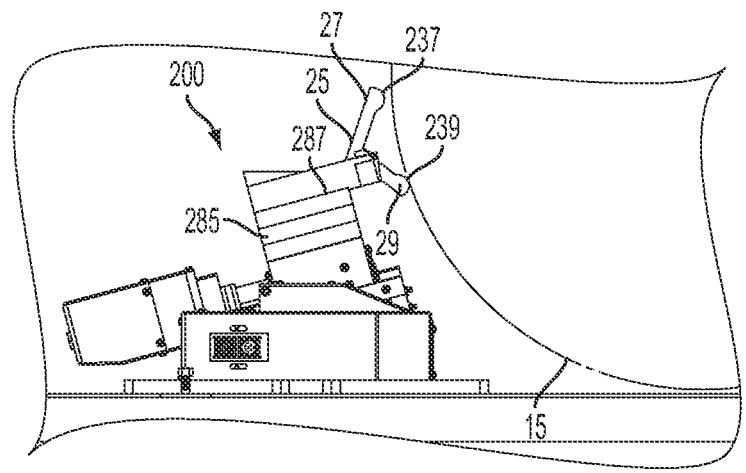
FIG. 16 is a side planar view schematic illustration of the apparatus for reprofiling shown in FIG. 7 shown using shims to raise the cutting tool position and with the alignment device indicating that a cutting tool position is too high in accordance with another exemplary embodiment.
Figure 17:
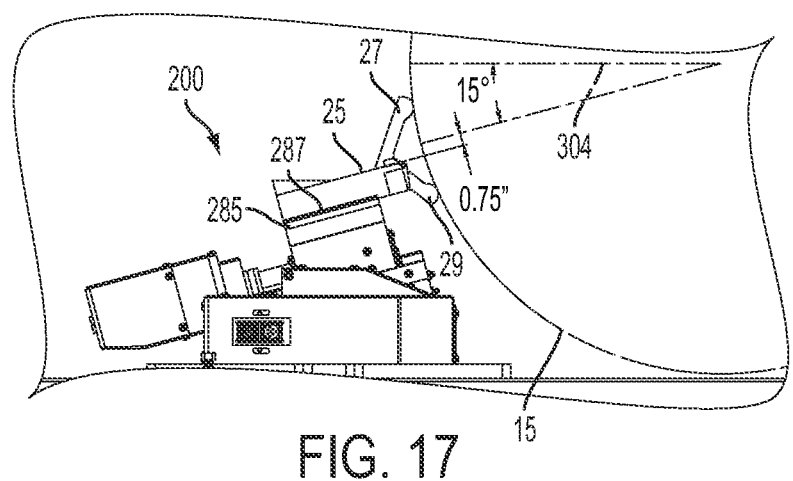
FIG. 17 is side planar view schematic illustration of the apparatus for reprofiling shown in FIG. 7 using shims and with the alignment device indicating that the cutting tool position is in a proper position, in accordance with still another exemplary embodiment.

With reference to FIGS. 15-17, alignment device 25 includes a first member 27 and a second member 29 disposed at an angle. The angle can be chosen based upon system parameters and design criteria. In one preferred embodiment, the angle can be from 1 to 179 degrees, preferably between 40-150 degrees. Alignment device 25 preferably is configured as a center finder which indicates a proper alignment when an end 237 and an end 239 of members 27 and 29, respectively, engage wheel 15.

As shown in FIG. 15, alignment device 25 indicates that apparatus 200 is too low because end 239 is not touching or within one sixteenth of an inch of wheel 15 and end 237 is touching wheel 15. Shims 285 (FIG. 16) can be added to raise apparatus 200. In one embodiment, if ends 237 and 239 are within one sixteenth of an inch of wheel 15, alignment is adequate. Device 25 of apparatus 200 can also use the flange of wheel 15 for determining the appropriate tool height if wheel 15 is out-of-round.

With reference to FIG. 16, apparatus 200 is shown at a position that is too high. The too high position is manifested by end 239 of member 29 touching wheel 15 and an end 237 of member 27 not touching wheel 15 or within a sixteenth of an inch of wheel 15. Shims 285 can be removed to lower the height of apparatus 200.

With reference to FIG. 17, alignment device 25 indicates that apparatus 200 is set at a proper height using shims 285. Proper height is determined as tool 224 (FIG. 7) is provided at ¾ of an inch below a center axis of wheel 15. The point of contact can be disposed at point where a ray from the center point of wheel 15 at a negative 15 degree angle below center line 304 reaches a periphery of wheel 15.

Preferably, alignment device 25 is disposed on top of a surface 241 of slide mechanism 230 or a top surface 281 of the top shim of apparatus 200 and not on top of tool 224. Alignment device 25 is preferably shaped to engage surfaces 241 and 287. In one embodiment, alignment device 25 is shaped so that a user cannot make an error and put device 25 in the wrong orientation (e.g., upside down). The placement of members 27 and 29 and the angles associated therewith can provide such an orientation.

Alignment device 25 can also be used with apparatus 20 as discussed above. Device 25 can be provided on surface 41 associated with tool 24 of apparatus 20.

With reference to FIGS. 8 and 10, alignment device 25 is utilized with apparatus 200. Alignment device 25 includes a first member 27 and a second member 29. When an end 237 (see FIGS. 15-17) of member 27 and an end 239 of member 29 touch the exterior surface of wheel 15, apparatus 200 is aligned below center line 304 of wheel 15. Center line 304 of wheel 15 is preferably an axis that extends parallel to rail 18 and through a center point of the wheel. By using alignment mechanism 25, an operator of apparatus 200 can ensure that cutting tool 224 engages wheel 15 below the center line 304 in one preferred embodiment.

Alignment device 25 is preferably a mechanical alignment device such as a center finder. Alignment device 25 can be manufactured from a variety of materials, including high strength plastics, metals, etc. In one embodiment, alignment device 25 is one inch thick. FIG. 18 shows exemplary dimensions for alignment tool 25.

With reference to FIGS. 11 and 12, a wheel 15 opposite wheel 12 is profiled using an apparatus 200. However, unlike apparatus 20, rotation of cutting tool 224 is not necessary as an inverse profile is utilized. Accordingly, the computer control stores a profile for wheel 12 and an inverse profile for wheel 15. Alignment device 25 is shown for use with wheel 15 in FIG. 12.

With reference to FIGS. 13-14, apparatus 200 is shown in an in-house application including a work area 300. Apparatus 200 utilizes a vertical member 310 to support apparatus 200 in work area 300.

With reference to FIGS. 15-17, alignment device 25 includes a first member 27 and a second member 29 disposed at an angle. The angle can be chosen based upon system parameters and design criteria. In one preferred embodiment, the angle can be from 1 to 179 degrees, preferably between 40-150 degrees. Alignment device 25 preferably is configured as a center finder which indicates a proper alignment when an end 237 and an end 239 of members 27 and 29, respectively, engage wheel 15.

As shown in FIG. 15, alignment device 25 indicates that apparatus 200 is too low because end 239 is not touching or within one sixteenth of an inch of wheel 15 and end 237 is touching wheel 15. Shims 285 (FIG. 16) can be added to raise apparatus 200. In one embodiment, if ends 237 and 239 are within one sixteenth of an inch of wheel 15, alignment is adequate. Device 25 of apparatus 200 can also use the flange of wheel 15 for determining the appropriate tool height if wheel 15 is out-of-round.

With reference to FIG. 16, apparatus 200 is shown at a position that is too high. The too high position is manifested by end 239 of member 29 touching wheel 15 and an end 237 of member 27 not touching wheel 15 or within a sixteenth of an inch of wheel 15. Shims 285 can be removed to lower the height of apparatus 200.

With reference to FIG. 17, alignment device 25 indicates that apparatus 200 is set at a proper height using shims 285. Proper height is determined as tool 224 (FIG. 7) is provided at ¾ of an inch below a center axis of wheel 15. The point of contact can be disposed at point where a ray from the center point of wheel 15 at a negative 15 degree angle below center line 304 reaches a periphery of wheel 15.

Preferably, alignment device 25 is disposed on top of a surface of slide mechanism 230 or a top surface 281 of the top shim of apparatus 200 and not on top of tool holder 237. Alignment device 25 is preferably shaped to engage surfaces 241 and 287. In one embodiment, alignment device 25 is shaped so that a user cannot make an error and put device 25 in the wrong orientation (e.g., upside down). The placement of members 27 and 29 and the angles associated therewith can provide such an orientation.

Alignment device 25 can also be used with apparatus 20 as discussed above. Device 25 can be provided on surface 41 associated with tool 24 of apparatus 20.

With reference to FIGS. 21-32 and according to an exemplary embodiment, apparatus 400 is configured for similar operations as apparatus 200 described above with reference to FIGS. 7-12. Features and operations described above for apparatus 200 are available for apparatus 400 according to an exemplary embodiment.

Apparatus 400 is preferably a low profile lathe machine and engages wheel 15 well below a center line 304 (see FIG. 17). Center line 304 is preferably a line through the center point of wheel 15 and parallel to rail 18 (See FIG. 1). Apparatus 400 is relatively compact and approaches wheel 12 at an acute angle to optimize the ability to fit underneath the majority of components associated with wheel 12 (e.g., brake assemblies, straps, hangers, collection tanks, steps, etc.).

Figure 21:
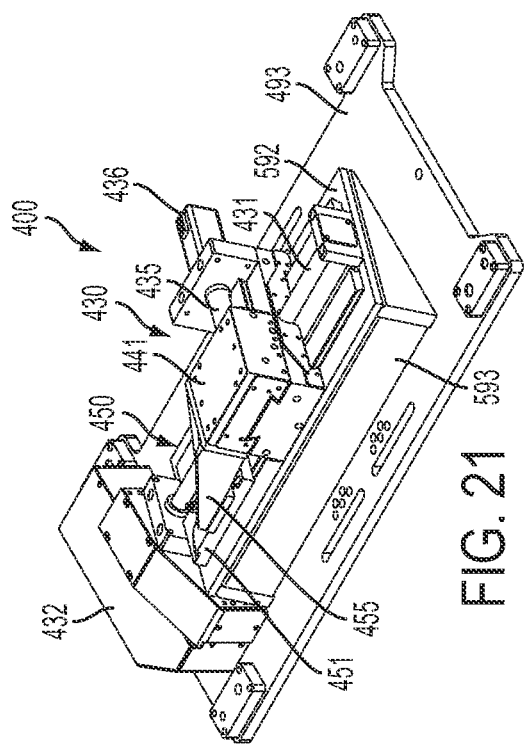
FIG. 21 is a perspective view schematic illustration of a low profile apparatus for re-profiling a wheel in accordance with yet another exemplary embodiment.
Figure 24:
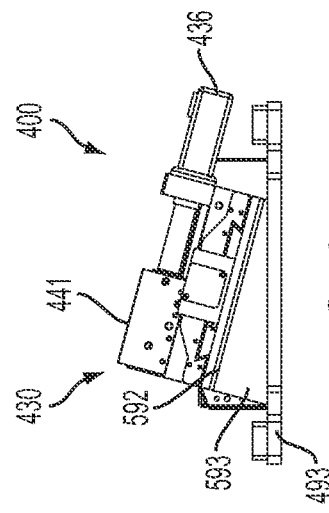
FIG. 24 is a side view schematic illustration of the apparatus for re-profiling illustrated in FIG. 21 in accordance with another exemplary embodiment.
Figure 22:
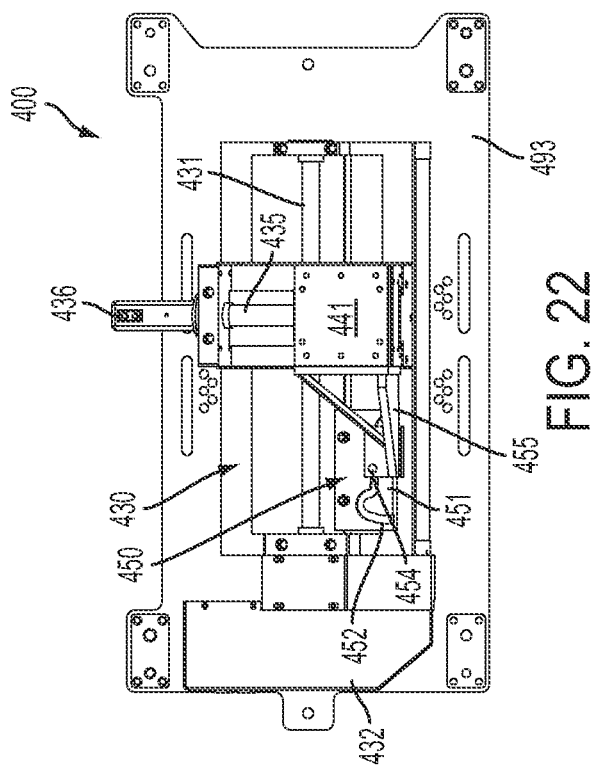
FIG. 22 is a top view schematic illustration of the apparatus for re-profiling illustrated in FIG. 21 in accordance with another exemplary embodiment.
Figure 23:
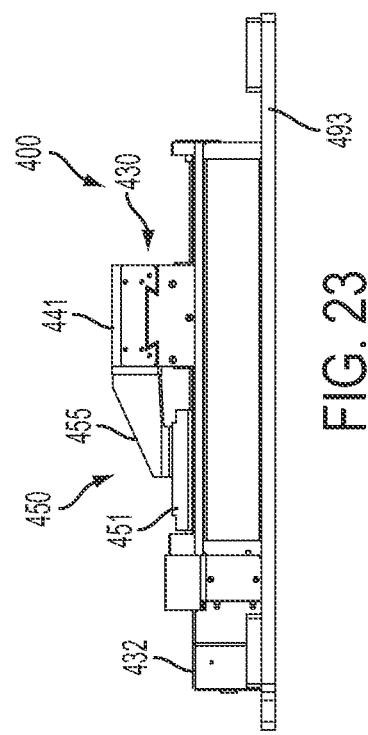
FIG. 23 is a front view schematic illustration of the apparatus for re-profiling illustrated in FIG. 21 in accordance with another exemplary embodiment.
Figure 25:
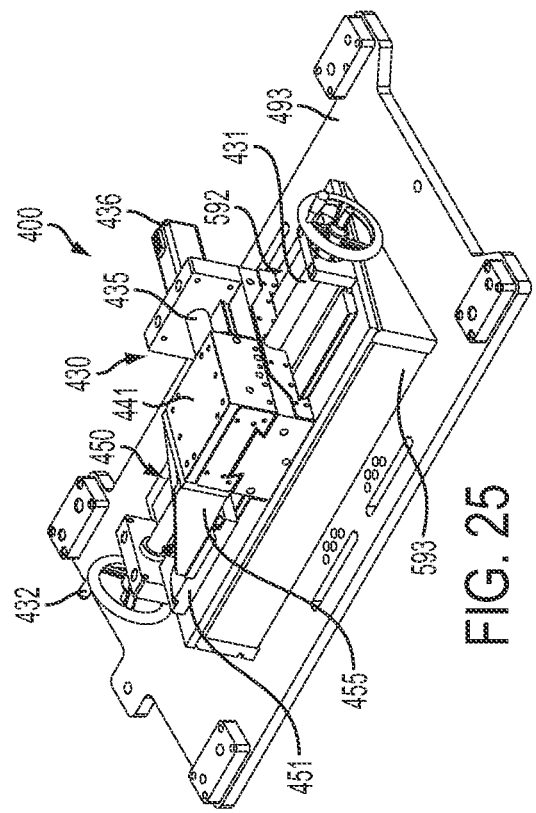
FIG. 25 is a perspective view schematic illustration of a low profile apparatus for re-profiling a wheel in accordance with yet another exemplary embodiment.
Figure 28:
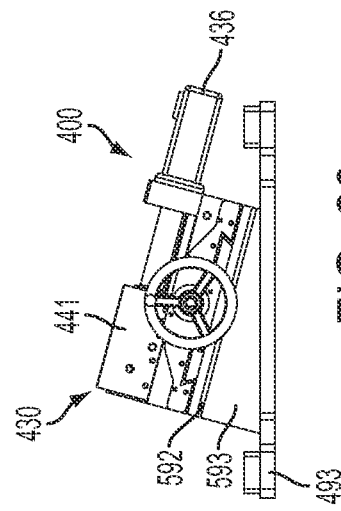
FIG. 28 is a side view schematic illustration of the apparatus for re-profiling illustrated in FIG. 25 in accordance with another exemplary embodiment.
Figure 26:
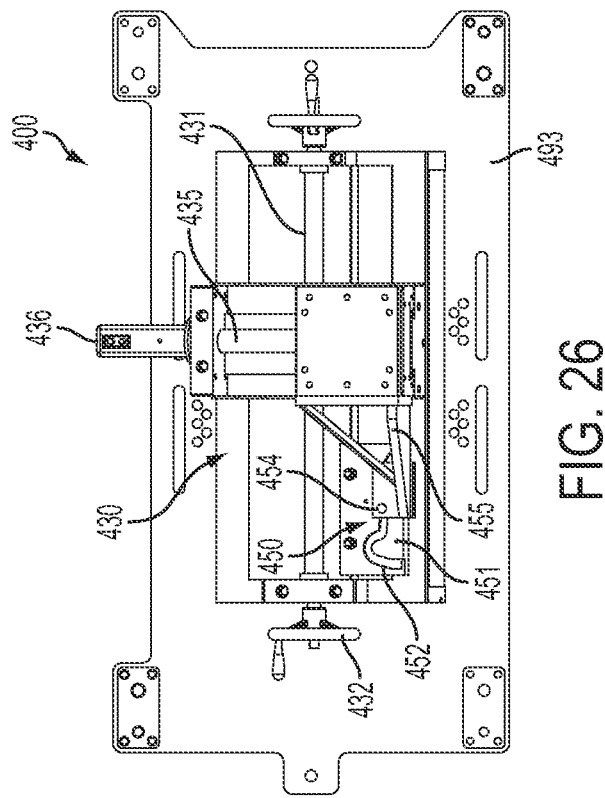
FIG. 26 is a top view schematic illustration of the apparatus for re-profiling illustrated in FIG. 25 in accordance with another exemplary embodiment.
Figure 27:
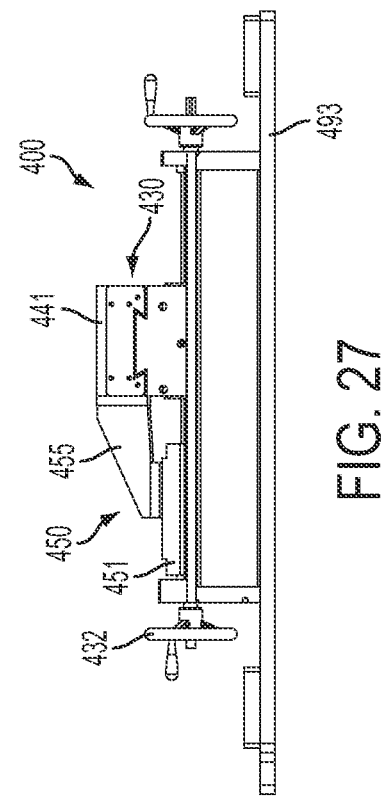
FIG. 27 is a front view schematic illustration of the apparatus for re-profiling illustrated in FIG. 25 in accordance with another exemplary embodiment.
Figure 29:
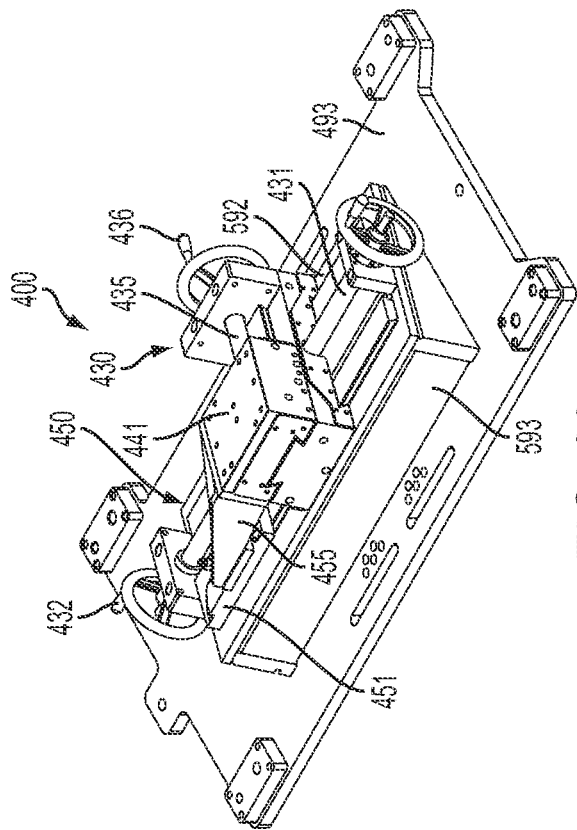
FIG. 29 is a perspective view schematic illustration of a low profile apparatus for re-profiling a wheel in accordance with yet another exemplary embodiment.
Figure 32:
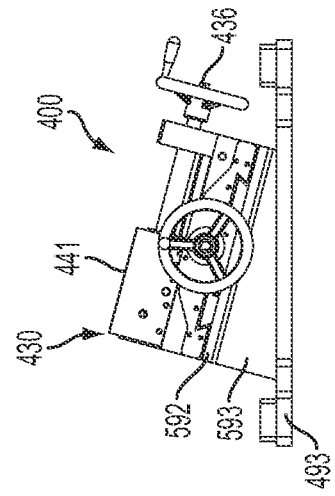
FIG. 32 is a side view schematic illustration of the apparatus for re-profiling illustrated in FIG. 29 in accordance with another exemplary embodiment.
Figure 30:
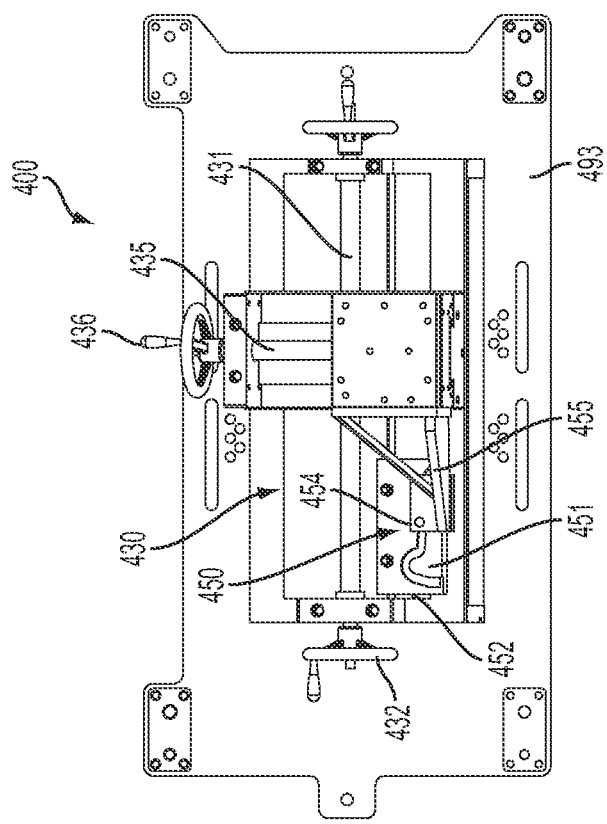
FIG. 30 is a top view schematic illustration of the apparatus for re-profiling illustrated in FIG. 29 in accordance with another exemplary embodiment.
Figure 31:
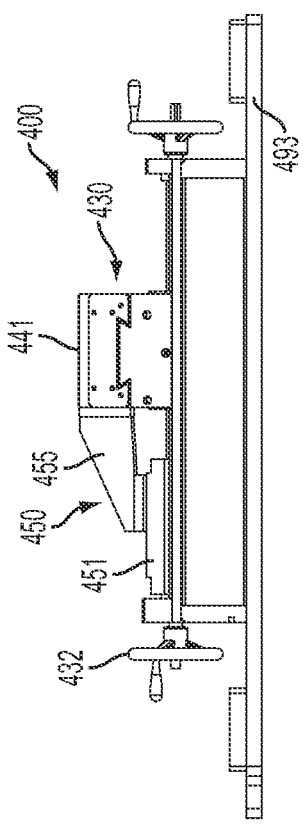
FIG. 31 is a front view schematic illustration of the apparatus for re-profiling illustrated in FIG. 29 in accordance with another exemplary embodiment.

A cutting tool (not shown, but similar to cutting tool 24 discussed above) is disposed on a surface 441 of slide mechanism 430. Slide mechanism 430 is preferably disposed at an angle (e.g., 0-90 degrees, preferably 15-45 degrees) with respect to the bottom plate 493. The angle can be provided by a slanted surface 592 of a wedge 593 (FIGS. 21 and 24). The bottom plate 493 can be disposed parallel to the ground with a mechanism similar to mounting mechanism 290 described above. Slide mechanism 430 moves along a slide rail 431 along an X-axis perpendicular to rail 18 and a slide rail 435 disposed along a Y-axis parallel to rail 18. In an alternative embodiment, slide mechanism 430 can also move in a Z-direction perpendicular to the ground or perpendicular to a plane including the X-axis and the Y-axis. A first power source 432 is provided to move mechanism 430 along first slide 431 and a power source 436 is provided to move mechanism 430 along slide 435.

Instead of a computer-stored wheel profile, apparatus 400 can use a physical template 450 to control the cutting tool when re-profiling a wheel according to an exemplary embodiment. Template 450 includes a stationary plate 451 with a wheel profile or guide 452 that is coupled to wedge 593 and a pin 454 that is coupled to slide mechanism 430. According to an exemplary embodiment, pin 454 is coupled to slide mechanism 430 with a bracket 455. Different plates 451 may be provided with guides 452 for various standard wheel profiles.

Pin 454 engages guide 452. First power source 432 moves pin 454 across guide 452 and second power source 436 maintains a pressure of pin 454 on guide 452 and the cutting tool on the wheel. Apparatus 400 is calibrated by placing the cutting tool at the top of the wheel flange. Slide mechanism 430 is then adjusted along the slide rails 431 and 435 such that pin 454 is at the top of the flange of guide 452. The wheel is profiled as pin 454 moves along guide 452. Because pin 454 is rigidly coupled to the cutting tool via slide mechanism 430, the movement of pin 454 as it moves along wheel profile 452 is matched by the movement of the cutting tool along the surface of the wheel.

Referring to FIGS. 21-24, according to one exemplary embodiment, first power source 432 is a DC motor. Second power source 436 is a hydraulic or pneumatic motor that provides a positive pressure. Because pin 454 begins at the top of the flange of guide 452, second power source can provide only positive pressure, pushing pin 454 in one direction along the Y-axis as slide mechanism 430 moves along the X-axis.

Referring to FIGS. 25-28, according to another exemplary embodiment, first power source 432 is a hand wheel. The rotational movement of the hand wheel is translated to a linear motion (e.g., via a leadscrew mechanism) along slide rail 431. First power source 432 may comprise hand wheels provided on either side of apparatus 400. In this way, an operator can control motion of slide mechanism 430 along slide rail 431 from either side, allowing the operator to be on the outside of the wheel being profiled regardless of which side of the railway vehicle the wheel is located. Similar to the embodiment shown in FIGS. 20-23, second power source 436 is a hydraulic or pneumatic motor that provides a positive pressure. Because pin 454 begins at the top of the flange of guide 452, second power source can provide only positive pressure, pushing pin 454 in one direction along the Y-axis as slide mechanism 430 moves along the X-axis.

Referring to FIGS. 29-32, according to another exemplary embodiment, first power source 432 is a hand wheel. Similar to the embodiment shown in FIGS. 25-28, the rotational movement of the hand wheel is translated to a linear motion (e.g., via a leadscrew mechanism) along slide rail 431. Second power source 436 is also a hand wheel. Rotational movement of the hand wheel is translated to a linear motion (e.g., via a leadscrew mechanism) along slide rail 435. By applying a rotational force to the hand wheel, an operator can maintain pressure on guide 452 by pin 454 and maintain pressure on the wheel by the cutting tool.

According to other exemplary embodiments, power sources 432 and 436 may be another power source such as a spring or other device that provides suitable power to move slide mechanism 430 along slide rails 431 and 435 and engages the cutting tool with the wheel to profile the wheel. In other exemplary embodiments, power sources 432 and/or 436 may utilize a combination of power sources. For instance, a hand-driven mechanism may be utilized to move slide mechanism 430 along the X-axis or Y axis in one direction, while a powered device (e.g., an electrical, pneumatic, or hydraulic motor, etc.) may be utilized to move slide mechanism along the X-axis or Y-axis in the opposite direction.

With reference to FIGS. 33-36 and according to an exemplary embodiment, apparatus 600 is configured for similar operations as apparatus 200 described above with reference to FIGS. 7-12. Features and operations described above for apparatus 200 are available for apparatus 600 according to an exemplary embodiment.

Like apparatus 200, apparatus 600 is preferably a low profile lathe machine and engages wheel 15 well below a center line 304 (see FIG. 17). Center line 304 is preferably a line through the center point of wheel 15 and parallel to rail 18. Apparatus 600 is relatively compact and approaches wheel 12 at an acute angle to optimize the ability to fit underneath the majority of components associated with wheel 12 (e.g., brake assemblies, straps, hangers, collection tanks, steps, etc.).

A cutting tool (not shown, but similar to cutting tool 24 discussed above) is disposed on a surface 641 of slide mechanism 630. Slide mechanism 630 is preferably disposed at an angle (e.g., 0-90 degrees, preferably 15-45 degrees) with respect to the bottom plate 693. The angle can be provided by a slanted surface 792 of a wedge 793 (FIGS. 33 and 36). The bottom plate 693 can be disposed parallel to the ground with a mechanism similar to mounting mechanism 290 described above. Slide mechanism 630 moves along a slide rail 631 along an X-axis perpendicular to rail 18 and a slide rail 635 disposed along a Y-axis parallel to rail 18. In an alternative embodiment, slide mechanism 630 can also move in a Z-direction perpendicular to the ground or perpendicular to a plane including the X-axis and the Y-axis. A first power source 632 is provided to move mechanism 630 along first slide 631 and a power source 636 is provided to move mechanism 630 along slide 635.

According to another exemplary embodiment, first power source 632 is a hand wheel. The rotational movement of the hand wheel is translated to a linear motion (e.g., via a leadscrew mechanism) along slide rail 631. Second power source 636 is also a hand wheel. Rotational movement of the hand wheel is translated to a linear motion (e.g., via a leadscrew mechanism) along slide rail 635.

Instead of a computer-stored wheel profile or a physical template, apparatus 600 is controlled manually by an operator using power sources 632 and 636 to control the cutting tool when re-profiling a wheel. After a pass is completed, the operator may use a device such as a wheel gage to check the accuracy of the wheel profile. The operator may then use the hand wheels to control the cutting tool in additional passes until the wheel profile matches the wheel gage Referring now to FIGS. 7 and 20, a method for profiling wheel 12 involve first disengaging wheel 12 from rails 18 (step 70). According to an exemplary embodiment, a jack or lift is used to raise one set of wheels 12 off of rails 18 while leaving the other set of wheels engaged. Wheels 12 and axle 14 are both left coupled to the railcar or locomotive to reduce the amount of time needed to profile wheels 12.

After wheel 12 have been disengaged from rail 18, apparatus 200 is coupled to rails 18 proximate to a wheel 12 with mounting mechanism 290 (step 72). The position of cutting tool 224 relative to wheel 12 is aligned by using alignment device 25 (step 73). By positioning apparatus 200 so that alignment device 25 engages wheel 12 at two end points of device 25, the operator is assured that apparatus 200 is in proper position.

Advantageously, brake and other assemblies associated with wheel 12 do not have to be removed when wheel 15 is profiled using apparatus 200. The low profile associated with apparatus 200 allows wheel 15 to be profiled without removing significant apparatus from wheel 15 or other parts of the train.

Wheel 12 is rotated so cutting tool 224 can re-profile the entire circumference of wheel 12 (step 74). However, powering the locomotive generally causes all the driving wheels on locomotive to turn. To turn only the wheel being profiled by apparatus 200, an external power source is used. According to one exemplary embodiment, wheel 12 is turned by powering a traction motor with a portable power source such as a DC welder. If the railcar is an unpowered car, such as a box car, wheel 12 is turned by a chain and sprocket drive mechanism or friction wheel drive mechanism.

With wheel 12 rotating, cutting tool 224 profiles wheel 12 in accordance with a stored profile in the computer controller (step 76). Cutting tool 224 is moved by slide mechanism 230 along X-axis and Y-axis with drive motors 232 and 236. According to one exemplary embodiment, apparatus 200 may be used to machine wheel 12 to an AARIB regular flange profile or an AAR-IB narrow flange profile. According to other exemplary embodiments, the computer controller may provide other paths to apparatus 200 to machine wheel 12 to another profile.

Once wheel 12 has been profiled by apparatus 200, the railcar or locomotive is lowered back onto rails 18 (step 78).

The railcar or locomotive may then be raised again to profile the other wheels or, if all wheels have been re-profiled, railcar or locomotive may be returned to service. The above method can also be utilized by apparatus 20 and can be utilized to the profile wheel 15.

Figure 37:
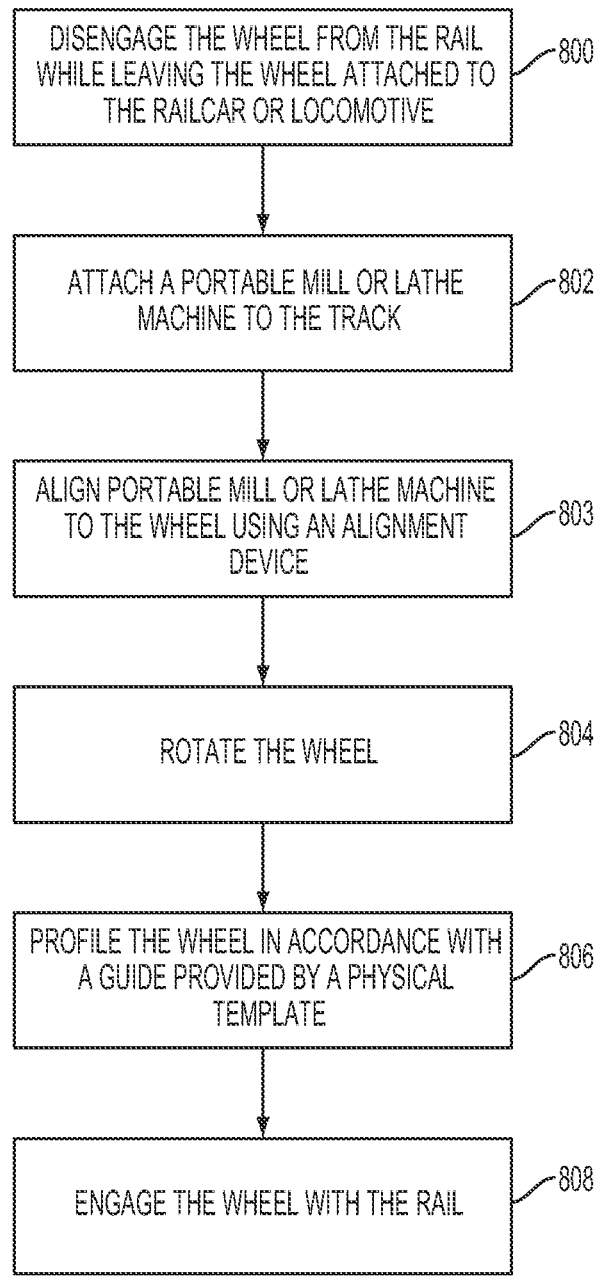
FIG. 37 is a flow diagram of a wheel re-profiling method in accordance with another exemplary embodiment.

Referring now to FIG. 37, a method for profiling wheel 12 involve first disengaging wheel 12 from rails 18 (step 800). According to an exemplary embodiment, a jack or lift is used to raise one set of wheels 12 off of rails 18 while leaving the other set of wheels engaged. Wheels 12 and axle 14 are both left coupled to the railcar or locomotive to reduce the amount of time needed to profile wheels 12.

After wheel 12 have been disengaged from rail 18, apparatus 400 is coupled to rails 18 proximate to a wheel 12 with a mounting mechanism (step 802). The position of the cutting tool relative to wheel 12 may be aligned by using an alignment device (step 803). Advantageously, brake and other assemblies associated with wheel 12 do not have to be removed when wheel 15 is profiled using apparatus 400. The low profile associated with apparatus 400 allows wheel 15 to be profiled without removing significant apparatus from wheel 15 or other parts of the train.

Wheel 12 is rotated so the cutting tool can re-profile the entire circumference of wheel 12 (step 804). However, powering the locomotive generally causes all the driving wheels on locomotive to turn. To turn only the wheel being profiled by apparatus 400, an external power source is used. According to one exemplary embodiment, wheel 12 is turned by powering a traction motor with a portable power source such as a DC welder. If the railcar is an unpowered car, such as a box car, wheel 12 is turned by a chain and sprocket drive mechanism or friction wheel drive mechanism.

With wheel 12 rotating, the cutting tool profiles wheel 12 in accordance with a guide 452 provided by a physical template 450 (step 806). The cutting tool is moved by slide mechanism 430 along X-axis and Y-axis with power sources 432 and 436. According to one exemplary embodiment, apparatus 400 may be used to machine wheel 12 to an AAR-IB regular flange profile or an AAR-IB narrow flange profile. According to other exemplary embodiments, the physical template 450 may provide other paths to apparatus 400 to machine wheel 12 to another profile.

Once wheel 12 has been profiled by apparatus 400, the railcar or locomotive is lowered back onto rails 18 (step 808). The railcar or locomotive may then be raised again to profile the other wheels or, if all wheels have been re-profiled, railcar or locomotive may be returned to service.

Figure 38:
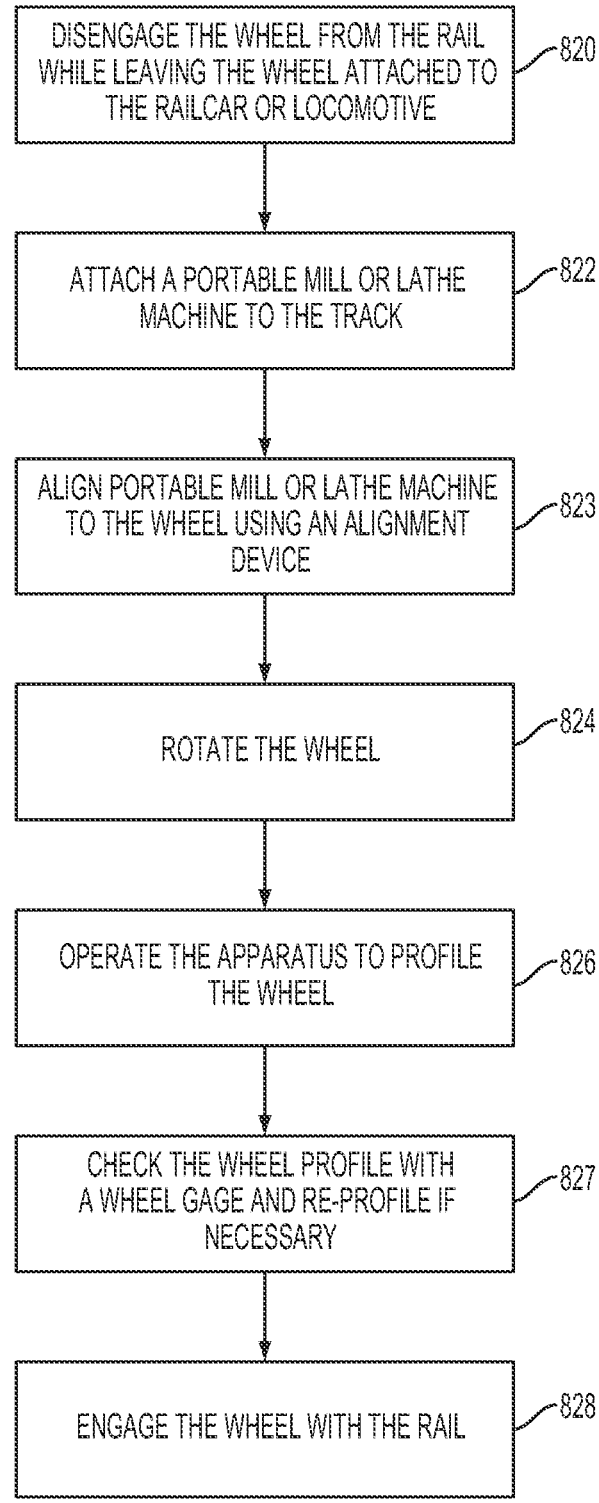
FIG. 38 is a flow diagram of a wheel re-profiling method in accordance with another exemplary embodiment.

Referring now to FIG. 38, a method for profiling wheel 12 involve first disengaging wheel 12 from rails 18 (step 820). According to an exemplary embodiment, a jack or lift is used to raise one set of wheels 12 off of rails 18 while leaving the other set of wheels engaged. Wheels 12 and axle 14 are both left coupled to the railcar or locomotive to reduce the amount of time needed to profile wheels 12.

After wheel 12 have been disengaged from rail 18, apparatus 600 is coupled to rails 18 proximate to a wheel 12 with a mounting mechanism (step 822). The position of the cutting tool relative to wheel 12 may be aligned by using an alignment device (step 823). Advantageously, brake and other assemblies associated with wheel 12 do not have to be removed when wheel 15 is profiled using apparatus 600. The low profile associated with apparatus 600 allows wheel 15 to be profiled without removing significant apparatus from wheel 15 or other parts of the train.

Wheel 12 is rotated so the cutting tool can re-profile the entire circumference of wheel 12 (step 824). However, powering the locomotive generally causes all the driving wheels on locomotive to turn. To turn only the wheel being profiled by apparatus 600, an external power source is used. According to one exemplary embodiment, wheel 12 is turned by powering a traction motor with a portable power source such as a DC welder. If the railcar is an unpowered car, such as a box car, wheel 12 is turned by a chain and sprocket drive mechanism or friction wheel drive mechanism.

With wheel 12 rotating, apparatus 600 is operated to profile wheel 12 (step 826) and the profile is checked with a wheel gage (step 827). The wheel is profiled with apparatus 600 and checked with a wheel gage until a desired profile is achieved. The cutting tool is moved by slide mechanism 630 along X-axis and Y-axis with power sources 632 and 636. According to one exemplary embodiment, apparatus 600 may be used to machine wheel 12 to an AAR-IB regular flange profile or an AAR-IB narrow flange profile. According to other exemplary embodiments, apparatus 600 may be operated to machine wheel 12 to another profile.

Once wheel 12 has been profiled by apparatus 600, the railcar or locomotive is lowered back onto rails 18 (step 828). The railcar or locomotive may then be raised again to profile the other wheels or, if all wheels have been re-profiled, railcar or locomotive may be returned to service.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the wheel mill as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages presented in the present application. The terms re-profiled and profiled are used interchangeably. Accordingly, all such modifications are intended to be included within the scope of the present disclosure. Other substitutions, modifications, changes and omissions may be made in the design, operating conditions and arrangement of the various exemplary embodiments without departing from the scope of the present disclosure.

What is claimed is:

1. A low profile portable apparatus for profiling a first wheel, the apparatus comprising:
    a base
    a wedge coupled to the base and comprising a top surface, the top surface being acutely angled between 15 and 45 degrees with respect to the base;
    a cutter;
    a positioning system configured to move the cutter relative to the first wheel along at least two axes, the positioning system coupled to the wedge; and
    a computer control configured to control the positioning system, wherein the positioning system is controlled so that the first wheel is free to spin without contact with the portable apparatus except at the cutter, wherein the computer control, the wedge, the positioning system and the cutter are disposed below a center point of the first wheel and above a bottom of a first rail associated with the first wheel, the base being attached to the first rail.

2. The apparatus of claim 1, further comprising an interface for attaching the wedge to the first rail, the interface comprising a bottom plate in contact with a second rail.

3. The apparatus of claim 2, wherein the cutter engages the first wheel below a center line that is parallel to the first rail and extends from the center point of the first wheel.

4. The apparatus of claim 1, wherein the two axes comprise a first axis below an axle of the first wheel, and a second axis perpendicular to the axle.

5. The apparatus of claim 1, further comprising a motor system comprising one or more gear reducers coupled to a second wheel on a same axle as the first wheel, the one or more gear reducers configured to reduce rotational speed and increase torque to the second wheel.

6. The apparatus of claim 1, wherein the positioning system is configured to calibrate a position of the cutter by moving the cutter to a plurality of positions to touch a plurality of places of the first wheel, and wherein the computer control is configured to store the plurality of positions.

7. The apparatus of claim 6, wherein the plurality of positions comprise at least one of a top of a flange of the first wheel, an outer edge of the first wheel, a first contact point and a second contact point on a tread of the first wheel.

8. The apparatus of claim 1, wherein the cutter is a high grade carbide lathe cutting tool.

9. The apparatus of claim 1, wherein the wedge allows the apparatus to approach the first wheel at an acute angle.

10. The apparatus of claim 1, wherein the cutter is disposed on a surface of the first wheel at an angle between 15 and 45 degrees.

* * * * *